(12) United States Patent
Wu et al.

(10) Patent No.: US 12,177,925 B2
(45) Date of Patent: Dec. 24, 2024

(54) SYSTEMS AND METHODS FOR PROVIDING SYSTEM INFORMATION VIA UE-TO-NETWORK RELAY

(71) Applicant: APPLE INC., Cupertino, CA (US)

(72) Inventors: Zhibin Wu, Cupertino, CA (US); Fangli Xu, Beijing (CN); Birgit Breining, Ba Varia-Bayern (DE); Dawei Zhang, Cupertino, CA (US); Haijing Hu, Cupertino, CA (US); Longda Xing, Cupertino, CA (US); Sethuraman Gurumoorthy, Cupertino, CA (US); Srirang A. Lovlekar, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 563 days.

(21) Appl. No.: 17/442,092

(22) PCT Filed: Apr. 13, 2021

(86) PCT No.: PCT/CN2021/086916
§ 371 (c)(1),
(2) Date: Sep. 22, 2021

(87) PCT Pub. No.: WO2022/016916
PCT Pub. Date: Jan. 27, 2022

(65) Prior Publication Data
US 2022/0312535 A1    Sep. 29, 2022

(30) Foreign Application Priority Data
Jul. 23, 2020  (WO) ................ PCT/CN2020/103781

(51) Int. Cl.
*H04W 76/20*    (2018.01)
*H04L 65/1016*  (2022.01)
(Continued)

(52) U.S. Cl.
CPC ......... *H04W 76/20* (2018.02); *H04L 65/1016* (2013.01); *H04W 8/005* (2013.01);
(Continued)

(58) Field of Classification Search
CPC .............. H04L 65/1016; H04W 48/12; H04W 74/0833; H04W 76/19; H04W 76/20;
(Continued)

(56) References Cited

U.S. PATENT DOCUMENTS 9,424,172 B1 *   8/2016  Helder ................ G06F 11/3668
2009/0144395 A1 * 6/2009  DeSalvo ............. G06F 16/9574
                                                          709/219

(Continued)

FOREIGN PATENT DOCUMENTS

CN    108633074 A    10/2018
CN    110073685 A     7/2019
(Continued)

OTHER PUBLICATIONS

U.S. Appl. No. 63/002,160 (Year: 2020).*
(Continued)

*Primary Examiner* — Dung B Huynh
(74) *Attorney, Agent, or Firm* — Dorsey & Whitney LLP

(57) ABSTRACT

Systems, apparatus and methods enable layer 2 (L2) relaying optimizations for a remote user equipment (UE) to receive system information (SI) from a relay UE. The relay UE may establish a sidelink communication channel with the remote UE that is in a radio resource control (RRC) idle state, an RRC inactive state, or an out-of-coverage (OOC) state with respect to the base station. The relay UE decodes a relay SI request received through the sidelink communication channel from the first remote UE. The relay SI request indicates requested system information. The Relay UE obtains the requested system information or a subset of the
(Continued)

requested system information from a memory device or from the base station and encodes a relay SI response to send to the first remote UE. The relay SI response includes the requested system information or the subset of the requested system information.

14 Claims, 19 Drawing Sheets

(51) Int. Cl.
  *H04W 8/00* (2009.01)
  *H04W 74/0833* (2024.01)
  *H04W 76/19* (2018.01)
  *H04W 88/04* (2009.01)
  *H04W 92/18* (2009.01)

(52) U.S. Cl.
  CPC ....... *H04W 74/0833* (2013.01); *H04W 76/19* (2018.02); *H04W 88/04* (2013.01); *H04W 92/18* (2013.01)

(58) Field of Classification Search
  CPC ..... H04W 8/005; H04W 88/04; H04W 92/18; Y02P 20/52
  See application file for complete search history.

(56) References Cited

U.S. PATENT DOCUMENTS

| | | | | |
|---|---|---|---|---|
| 2013/0182643 | A1* | 7/2013 | Pazos | H04W 24/02 370/328 |
| 2015/0201033 | A1* | 7/2015 | Gupta | H04L 67/5682 709/213 |
| 2016/0234759 | A1* | 8/2016 | Kubota | H04W 48/10 |
| 2016/0295503 | A1* | 10/2016 | Bucknell | H04W 76/18 |
| 2017/0311290 | A1* | 10/2017 | Adjakple | H04W 76/18 |
| 2017/0374608 | A1* | 12/2017 | Li | H04W 48/16 |
| 2018/0054237 | A1* | 2/2018 | Tseng | H04B 7/026 |
| 2018/0077746 | A1* | 3/2018 | Lee | H04L 5/006 |
| 2018/0084465 | A1* | 3/2018 | Jung | H04W 8/005 |
| 2018/0091964 | A1* | 3/2018 | Adachi | H04W 8/00 |
| 2018/0092027 | A1* | 3/2018 | Sheng | H04W 40/22 |
| 2018/0103369 | A1* | 4/2018 | Chou | H04W 8/24 |
| 2018/0220288 | A1* | 8/2018 | Agiwal | H04W 4/30 |
| 2018/0279275 | A1 | 9/2018 | Chen et al. | |
| 2018/0279377 | A1* | 9/2018 | Lin | H04W 74/0833 |
| 2018/0332585 | A1* | 11/2018 | Faurie | H04W 72/12 |
| 2019/0037625 | A1* | 1/2019 | Shih | H04W 72/231 |
| 2019/0045577 | A1* | 2/2019 | Kim | H04W 76/50 |
| 2019/0159011 | A1* | 5/2019 | Xu | H04W 4/00 |
| 2019/0165915 | A1* | 5/2019 | John Wilson | H04W 48/16 |
| 2019/0166622 | A1* | 5/2019 | Kim | H04W 48/08 |
| 2019/0253124 | A1* | 8/2019 | Awada | H04L 1/1621 |
| 2019/0261251 | A1* | 8/2019 | Lindheimer | H04W 48/16 |
| 2019/0320311 | A1* | 10/2019 | Wang | H04W 4/90 |
| 2019/0320443 | A1 | 10/2019 | Wang et al. | |
| 2020/0022109 | A1* | 1/2020 | Wang | H04W 76/27 |
| 2020/0029299 | A1 | 1/2020 | Kuang et al. | |
| 2020/0029318 | A1* | 1/2020 | Guo | H04L 1/1822 |
| 2020/0068477 | A1 | 2/2020 | Awada | |
| 2020/0084698 | A1* | 3/2020 | Rune | H04W 48/08 |
| 2020/0091991 | A1* | 3/2020 | Fujishiro | H04W 68/02 |
| 2020/0092685 | A1* | 3/2020 | Fehrenbach | H04W 76/27 |
| 2020/0100083 | A1* | 3/2020 | Lee | H04W 76/27 |
| 2020/0146107 | A1* | 5/2020 | Xiong | H04W 72/23 |
| 2020/0163123 | A1* | 5/2020 | Lee | H04W 74/0833 |
| 2020/0196387 | A1* | 6/2020 | Roy | H04W 4/80 |
| 2020/0228247 | A1* | 7/2020 | Guo | H04W 52/383 |
| 2020/0236613 | A1* | 7/2020 | Frenger | H04B 7/0617 |
| 2020/0245226 | A1* | 7/2020 | Kuang | H04W 48/08 |
| 2020/0245231 | A1* | 7/2020 | Wei | H04W 48/14 |
| 2020/0245293 | A1* | 7/2020 | Peisa | H04W 76/11 |
| 2020/0296639 | A1* | 9/2020 | Agiwal | H04B 17/318 |
| 2020/0344574 | A1* | 10/2020 | Park | H04L 1/0072 |
| 2020/0344671 | A1* | 10/2020 | He | H04W 48/12 |
| 2020/0374782 | A1* | 11/2020 | Chen | H04W 48/14 |
| 2020/0413431 | A1* | 12/2020 | Park | H04L 5/00 |
| 2021/0029623 | A1* | 1/2021 | Awada | H04W 72/0446 |
| 2021/0050931 | A1* | 2/2021 | Hahn | H04L 5/0007 |
| 2021/0051569 | A1* | 2/2021 | Arjona | H04W 72/53 |
| 2021/0120476 | A1* | 4/2021 | Lee | H04W 48/10 |
| 2021/0153105 | A1* | 5/2021 | Tao | H04W 60/04 |
| 2021/0153168 | A1* | 5/2021 | Sarkis | H04W 72/02 |
| 2021/0160926 | A1* | 5/2021 | Tao | H04W 74/006 |
| 2021/0195503 | A1* | 6/2021 | Tang | H04W 68/02 |
| 2021/0195637 | A1* | 6/2021 | Xue | H04W 74/0808 |
| 2021/0211219 | A1* | 7/2021 | Sarkis | H04L 1/0041 |
| 2021/0250898 | A1* | 8/2021 | Abedini | H04W 68/005 |
| 2021/0298043 | A1* | 9/2021 | He | H04W 28/0278 |
| 2021/0306043 | A1* | 9/2021 | Damnjanovic | H04W 72/0446 |
| 2021/0306414 | A1* | 9/2021 | Beard | G06F 12/0826 |
| 2021/0321369 | A1* | 10/2021 | Chen | H04W 76/27 |
| 2021/0331701 | A1* | 10/2021 | Hur | G05D 1/0212 |
| 2021/0352745 | A1* | 11/2021 | Yang | H04W 72/04 |
| 2021/0410126 | A1* | 12/2021 | Ganesan | H04L 1/1854 |
| 2021/0410129 | A1* | 12/2021 | Freda | H04W 72/543 |
| 2022/0022228 | A1* | 1/2022 | Wang | H04W 4/46 |
| 2022/0046520 | A1* | 2/2022 | Takano | H04W 76/11 |
| 2022/0078796 | A1* | 3/2022 | Kim | H04W 48/14 |
| 2022/0132348 | A1* | 4/2022 | Orsino | H04W 24/10 |
| 2022/0191762 | A1* | 6/2022 | Huang | H04W 36/30 |
| 2022/0217579 | A1* | 7/2022 | Seo | H04L 1/1896 |
| 2022/0240225 | A1* | 7/2022 | Lee | H04W 72/02 |
| 2022/0248376 | A1* | 8/2022 | Hui | H04W 72/20 |
| 2022/0272612 | A1* | 8/2022 | Ingale | H04W 48/10 |
| 2022/0272667 | A1* | 8/2022 | Chen | H04W 48/12 |
| 2022/0287024 | A1* | 9/2022 | Hahn | H04W 72/51 |
| 2022/0338283 | A1* | 10/2022 | Wang | H04W 48/10 |
| 2023/0015755 | A1* | 1/2023 | Wang | H04W 72/20 |
| 2023/0015859 | A1* | 1/2023 | Tseng | H04W 76/20 |
| 2023/0033126 | A1* | 2/2023 | Agiwal | H04B 17/318 |
| 2023/0037980 | A1* | 2/2023 | Kim | H04W 72/0446 |
| 2023/0224802 | A1* | 7/2023 | Cheng | H04W 48/12 370/328 |
| 2023/0224859 | A1* | 7/2023 | Cheng | H04W 68/02 455/458 |
| 2023/0239072 | A1* | 7/2023 | Xu | H04L 1/0013 370/329 |
| 2023/0328840 | A1* | 10/2023 | Cheng | H04W 52/0219 370/329 |
| 2024/0015500 | A1* | 1/2024 | Hong | H04W 8/24 |
| 2024/0049117 | A1* | 2/2024 | Ishii | H04L 5/0044 |

FOREIGN PATENT DOCUMENTS

| | | |
|---|---|---|
| EP | 3592103 A1 | 1/2020 |
| WO | 2018170914 A1 | 9/2018 |
| WO | 2018194390 A1 | 10/2018 |
| WO | 2019084714 A1 | 5/2019 |

OTHER PUBLICATIONS

U.S. Appl. No. 63/002,164 (Year: 2020).*
PCT/CN2021/086916, International Search Report and Written Opinion, Jul. 9, 2021, 9 pages.

* cited by examiner

| On Demand SI Acquisition | Rel-15 Design | Rel-16 Enhancement |
|---|---|---|
| UE request | - IDLE/INACTIVE UE<br>- MSG1/MSG3 (CCCH) based request<br>- Per SI request | - CONNECTED UE<br>- DedicatedSIBRequest message (DCCH) based request<br>- Per SIB request |
| NW provision | - Via broadcast only | - Via RRCReconfiguration if no CSSS is configured on activated BWP<br>- Via broadcast |

FIG. 8

| Remote UE State | CONNECTED to relay UE Via PC5 | Relay UE connected to gNB | Solutions |
|---|---|---|---|
| Case 1 | Out of coverage IDLE/INACTIVE | X | Does not matter | Unsolicited: Relay UE broadcast |
| Case 2 | IDLE/INACTIVE | ✓ | Does not matter | Solicited: Option 1: UE use PC5-RRC signaling to solicit from relay UE. After relay UE obtained it from stored SI or get it from gNB, it forwards to remote UE. Option 2: UE enters CONNECTED first, then follow case 3 |
| Case 3 | CONNECTED | ✓ | ✓ | Solicited: UE use DedicatedSIBRequest to trigger on-demand SI retrieval, as same as the support of relaying of the other RRC procedures. gNB deliver via RRCReconfiguration (dedicated signaling) |

FIG. 9

| | | |
|---|---|---|
| Upper layer related | PLMN-IdentityInfo (Cell ID, TAC, RNA Area) | ✓ |
| | eCallOverIMS support | ✓ |
| | UAC-barring-info | ✓ |
| | IMS-emergency support | ✓ |
| | posSIB mapping table | ✓ |
| | ConnectEstFailControl | ✓ |
| L1-related | Timing advance | ✗ |
| | Subcarrier Spacing | ✗ |
| | RACH config | ✗ |
| | SI scheduling config | ✗ |
| | System frame number | ✓ (?) |

FIG. 10

SYSTEMS AND METHODS FOR PROVIDING SYSTEM INFORMATION VIA UE-TO-NETWORK RELAY

TECHNICAL FIELD

This application relates generally to wireless communication systems including a layer 2 (L2) relay of data to a remote user equipment (UE) through a relay UE.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Relaying in a wireless communication system can be realized at different layers of the protocol stack. A simple amplifying and forwarding relay UE can be realized at the Layer 1 (L1) of the protocol stack where the relay UE has only (some part of) the PRY layer. Layer 2 (L2) relay UEs, which include the protocol stack up to the Medium Access Control (MAC)/Radio Link Control (RLC) layers, enable the possibility of decentralized radio resource management (RRM). Layer 3 (L3) or higher layer relay UEs may support all the protocol layers of a base station, except that they may not require an expensive backhaul as in a normal gNB or eNB and they are assumed to have low transmission power capabilities.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates a table showing supported on demand SI acquisition features in accordance with one embodiment.

FIG. 9 illustrates a table of various embodiments for L2 relay of SI based on a remote UE's state.

FIG. 10 illustrates a table showing which MSI parameters a relay UE may select to re-broadcast in accordance with one embodiment.

DETAILED DESCRIPTION

Techniques, apparatus and methods are disclosed that enable layer 2 (L2) relaying optimizations for a remote UE to receive system information (SI) over a non-3GPP or short-range link (e.g., WLAN, Bluetooth® (BT), etc.) from a relay (e.g., smartphone, etc.) when the remote UE is in-coverage or out-of-coverage. This saves battery of the remote UE as it need not send or receive data over a direct Uu connection with a base station and instead uses a nearby low power device as its relay.

An L2 relay may include a decode and forward (DF) type of relay technology wherein signals received from the base station are demodulated and decoded and then encoded and modulated again before being relayed to a remote UE. While introducing some delay, the DF process reduces noise in the relayed signal. Radio functions other than modulation/demodulation and encoding/decoding (such as mobility control, retransmission control by automatic repeat request (ARQ), and user data concatenation/segmentation/reassembly) are performed between the base station and the remote UE transparently with respect to the L2 relay. Additional details, including user plane and control plane protocol stacks for an L2 relay configuration, are provided below.

For L2 UE-to-network relay design, a remote UE may not have an efficient or way to obtain SI. Attempts to solve this problem may include having a relay UE re-broadcast the SI in an unsolicited manner. However, such re-broadcasting of SI adds to the power consumption of the relay UE. In lieu of an on demand SI retrieval mechanism introduced in the NR Uu interface, embodiments disclosed herein provide several different approaches to solve the problem. Certain embodiments also provide ways to reduce the SI information which is forwarded from the relay UE to the remote UE. For example, certain embodiments only forward essential SI based on the state of the remote UE.

Figure 1:
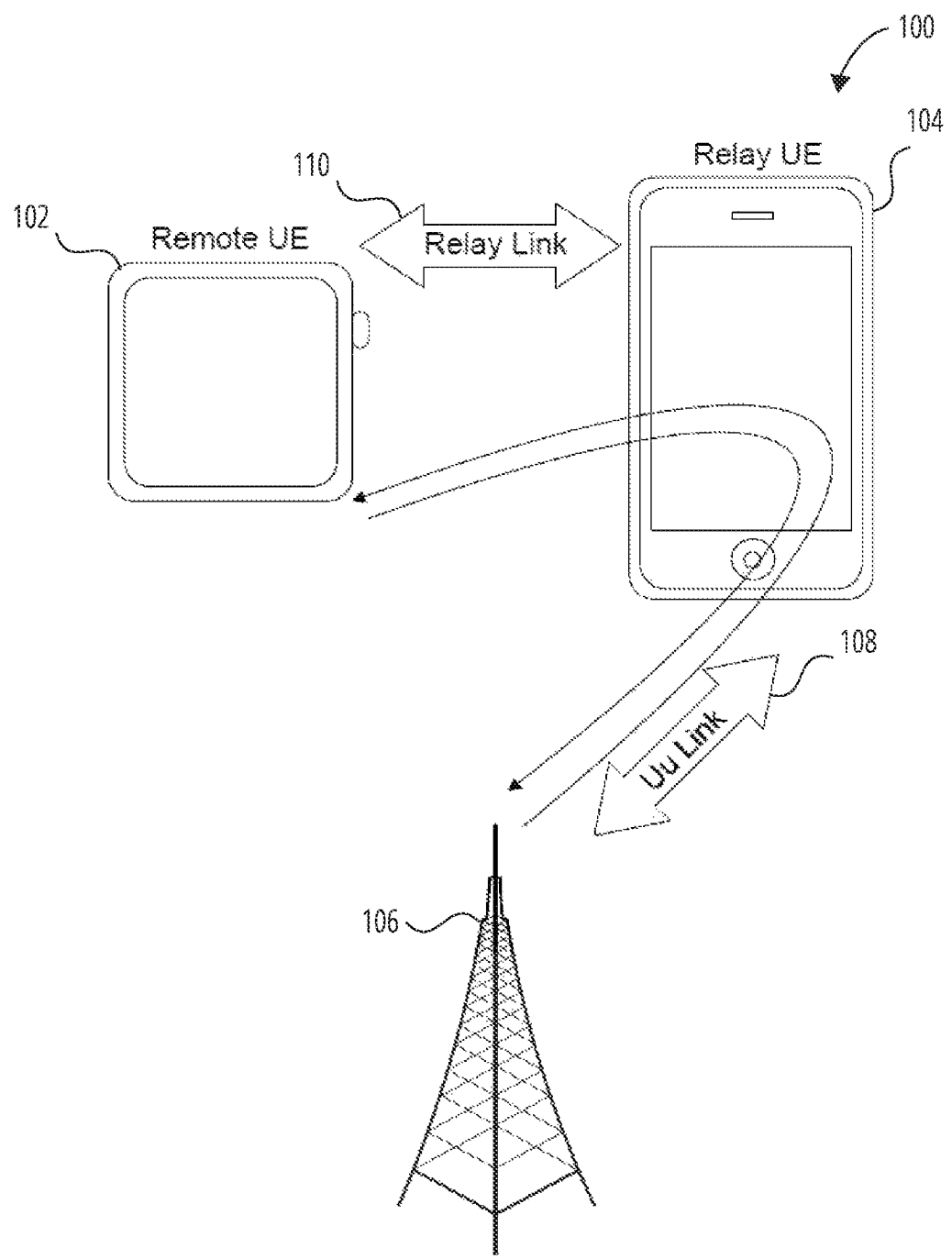
FIG. 1 illustrates a wireless communication system in accordance with one embodiment.

FIG. 1 is a diagram illustrating an example wireless communication system 100 for relaying SI to a remote UE 102 through a relay UE 104 from a base station 106, according to certain embodiments. The relay UE 104 may receive the SI from the base station 106 (e.g., gNB) through a Uu link 108. The remote UE 102 may include, for example, a wearable (e.g., a watch as shown in FIG. 1), an evolved remote UE, a machine-type-communication (MTC) device, a machine-to-machine (M2M) device, an Internet of Things (IoT) device, or other device that communicates using device-to-device (D2D) communication. The relay UE 104 may include, for example, a smartphone, an evolved relay UE, a master node or master sensor capable of relaying data through a wireless wide area network (WWAN) such as a 3GPP LTE/5G connection and through D2D with another UE such as the remote UE 102. D2D communication includes BT, WLAN (e.g., WiFi®), ProSe (e.g., LTE Rel 13 ProSe) or other near field communication.

As discussed in detail below, the relay UE 104 may access SI stored in a memory device (discussed below) or from the base station 106 through the Uu link 108. The Uu link 108 comprises an over the air (OTA) connection between the relay UE 104 and the base station 106, which is used to communicate with the wireless network. The relay UE 104 may forward at least part of the SI to the remote UE 102 through a relay link 110 (also referred to herein as a sidelink communication channel). The relay link 110 may comprise a PC5 interface. A PC5 interface is the interface using D2D communication that may refer to Proximity Services (ProSe) communication, but can refer to any D2D communication (e.g., WLAN or BT) that can happen over that interface. Support of layer 3 (L3) UE to network (UE to NW) relaying can make it feasible to apply PC5 interface technology (i.e., sidelink interface) to support some wearable use cases. However, the Proximity Services (ProSe) framework targets long range and relatively low rate broadcast communication, robust to interference. L3 relay technology is supported in LTE and has no impact on the access stratum layer (AS layer). In contrast, the embodiments described herein describe an L2 relay, which includes advantages over an L3 relay such as support in 5G networks, end-to-end security in the 3GPP AS layer, and better quality of service (QoS) control.

Figure 2A:
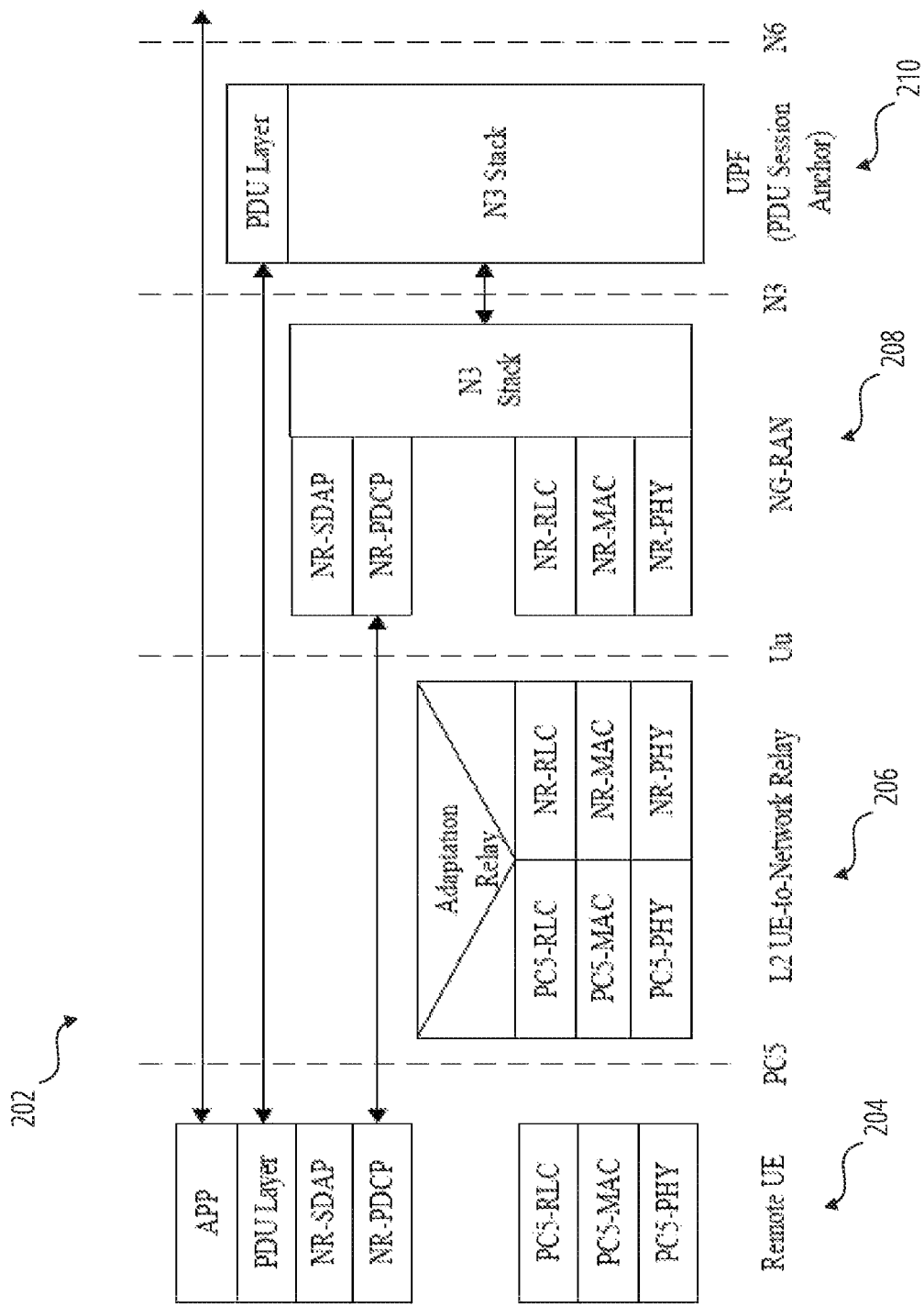
FIG. 2A illustrates a user plane protocol stack in accordance with one embodiment.
Figure 2B:
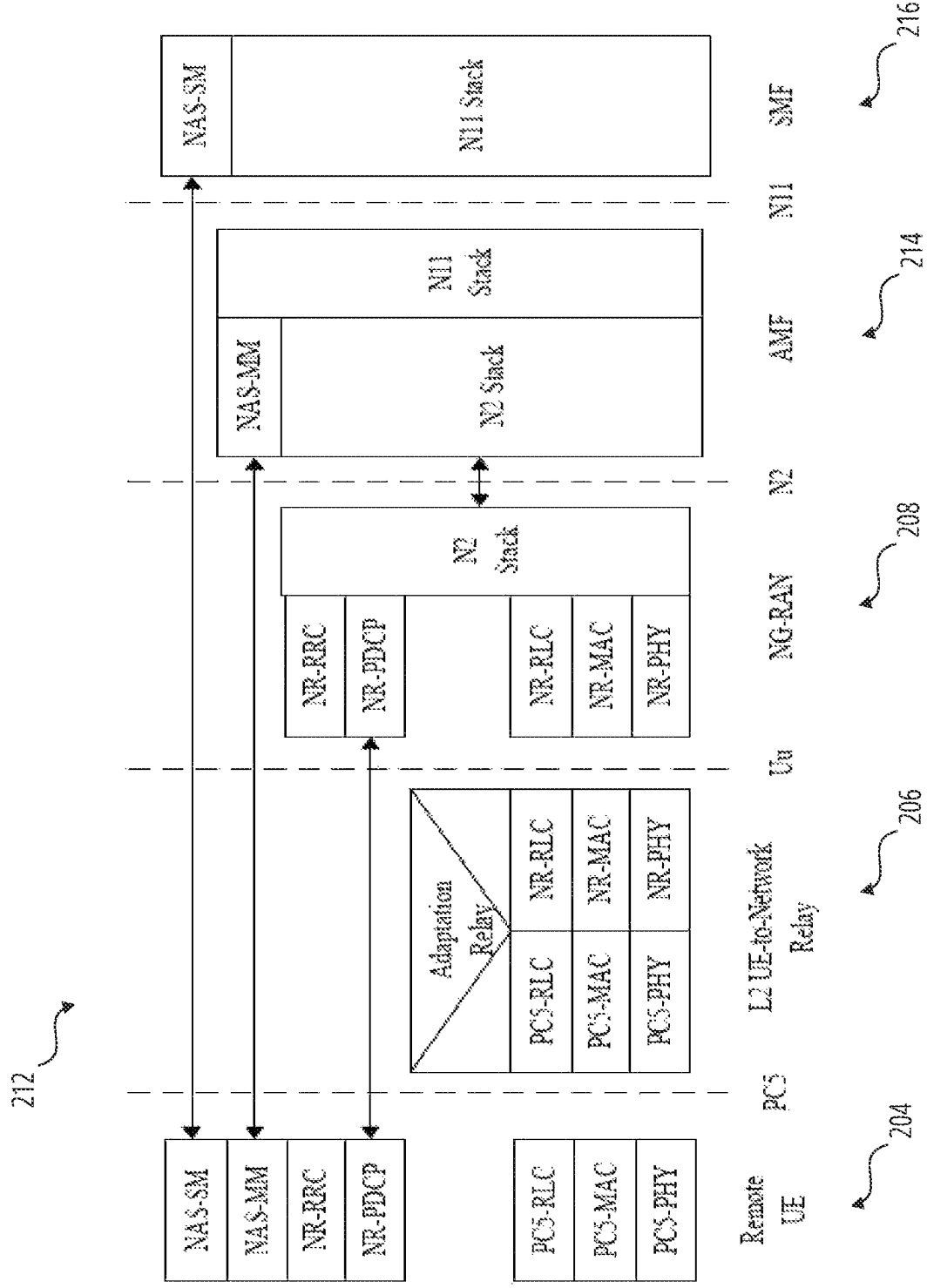
FIG. 2B illustrates a control plane protocol stack in accordance with one embodiment.

By way of example, FIG. 2A illustrates a user plane protocol stack 202 and FIG. 2B illustrates a control plane protocol stack 212 for an L2 relay configuration, according to certain embodiments. In this example, the control plane and the user plane are shown between a remote UE 204 (e.g., the remote UE 102 shown in FIG. 1), an L2 UE-to-Network Relay 206 (e.g., the relay UE 104 shown in FIG. 1), and an NG-RAN 208 (e.g., the base station 106 shown in FIG. 1). The remote UE 204 has established a sidelink communication channel with the L2 UE-to-Network Relay 206 through a PC5 interface, and the L2 UE-to-Network Relay 206 has established a link with the NG-RAN 208 through a Uu interface.

The L2 UE-to-Network Relay 206 is configured as an adaptation relay and includes a PC5 physical (PHY) layer, a PC5 media access control (MAC) layer, and a PC5 radio link control (RLC) layer to communicate through the PC5 interface with corresponding PC5-PHY, PC5-MAC, and PC5-RLC layers in the remote UE 204. The L2 UE-to-Network Relay 206 further includes NR-PHY, NR-MAC, and NR-RLC layers to communicate through the Uu interface with the NG-RAN 208 through corresponding NR-PHY, NR-MAC, and NR-RLC layers in the NG-RAN 208.

For the user plane protocol stack 202 shown in FIG. 2A, the NG-RAN 208 communicates with a user plane function (shown as UPF 210) through an N3 interface, wherein an N3 stack of the NG-RAN 208 interfaces with an N3 stack of the UPF 210. The UPF 210 may function as a protocol data unit (PDU) session anchor and may support features and capabilities to facilitate user plane operations such as packet routing and forwarding, interconnection to a data network, policy enforcement, and data buffering.

The user plane protocol stack 202 at the remote UE 204 further includes an NR packet data convergence protocol layer (NR-PDCP), an NR service data adaptation protocol layer (NR-SDAP), a PDU layer, and an application layer (APP). Although passing through the L2 UE-to-Network Relay 206, the NR-PDCP and NR-SDAP layers in the remote UE 204 transparently communicate (logically) with NR-PDCP and NR-SDAP layers in the L2 UE-to-Network Relay 206. Similarly, the PDU layer in the remote UE 204 transparently communicates with a PDU layer in the UPF 210 and the APP layer may transparently communicate with a data network (not shown) through an N6 interface.

For the control plane protocol stack 212 shown in FIG. 2B, the NG-RAN 208 communicates with an Access and Mobility Management Function (shown as AMF 214) through an N2 interface, wherein an N2 stack of the NG-RAN 208 interfaces with an N2 stack of the AMF 214. The AMF 214 may communicate with a Session Management Function (shown as SMF 216) through an N11 interface, wherein an N11 stack in the AMF 214 interfaces with an N11 stack in the SMF 216.

The control plane protocol stack 212 at the remote UE 204 further includes an NR-PDCP layer, an NR radio resource control layer (NR-RRC), a non-access stratum (NAS) mobility management layer (NAS-MM), and a NAS session management layer (NAS-SM). Although passing through the L2 UE-to-Network Relay 206, the NR-PDCP and NR-RRC layers in the remote UE 204 transparently communicate (logically) with NR-PDCP and NR-RRC layers in the L2 UE-to-Network Relay 206. Similarly, the NAS-MM layer in the remote UE 204 transparently communicates with a NAS-MM layer in the AMF 214 and the NAS-SM layer in the remote UE 204 transparently communicates with a NAS SM layer in the SMF 216.

Figure 3:
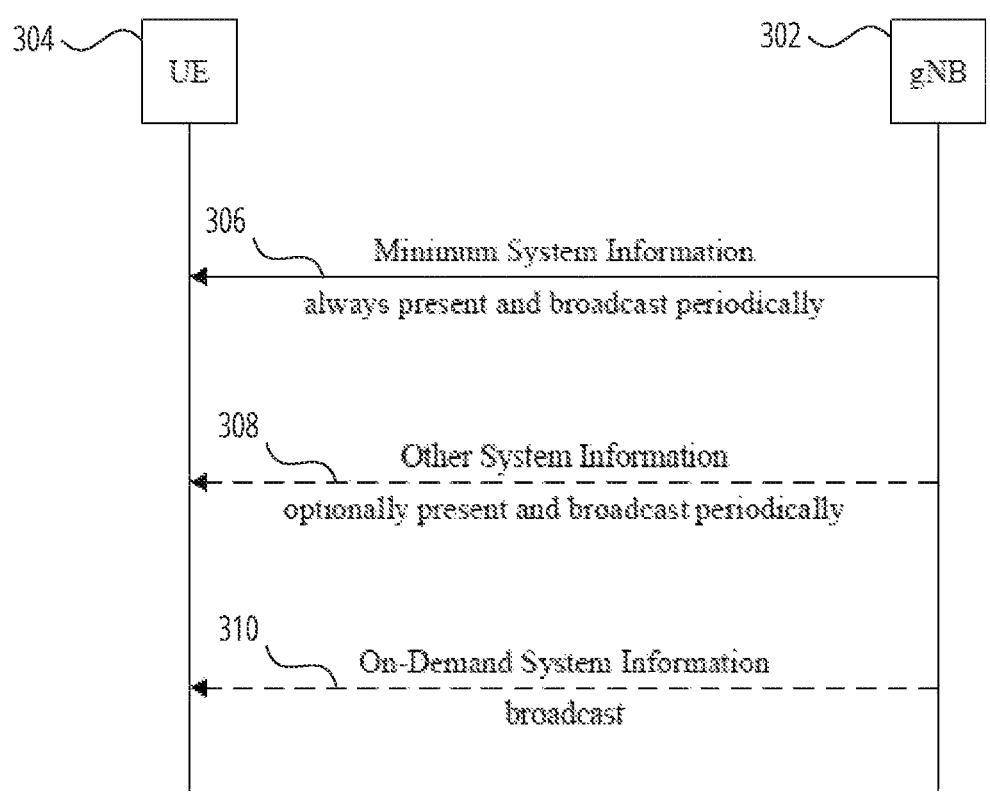
FIG. 3 illustrates system information provisioning in accordance with one embodiment.

FIG. 3 is a diagram illustrating system information provisioning, according to certain embodiments. A gNB 302 (or other base station) sends minimum system information 306 (MSI) to a UE 304. The minimum system information 306 may always be present and is broadcast periodically by the gNB 302. The gNB 302 may optionally also send other system information 308 (OSI) and/or on-demand system information 310 to the UE 304. The other system information 308 may be optionally present and may be broadcast periodically by the gNB 302. The gNB 302 may broadcast the on-demand system information 310 in response to a request by the UE 304.

Figure 4:
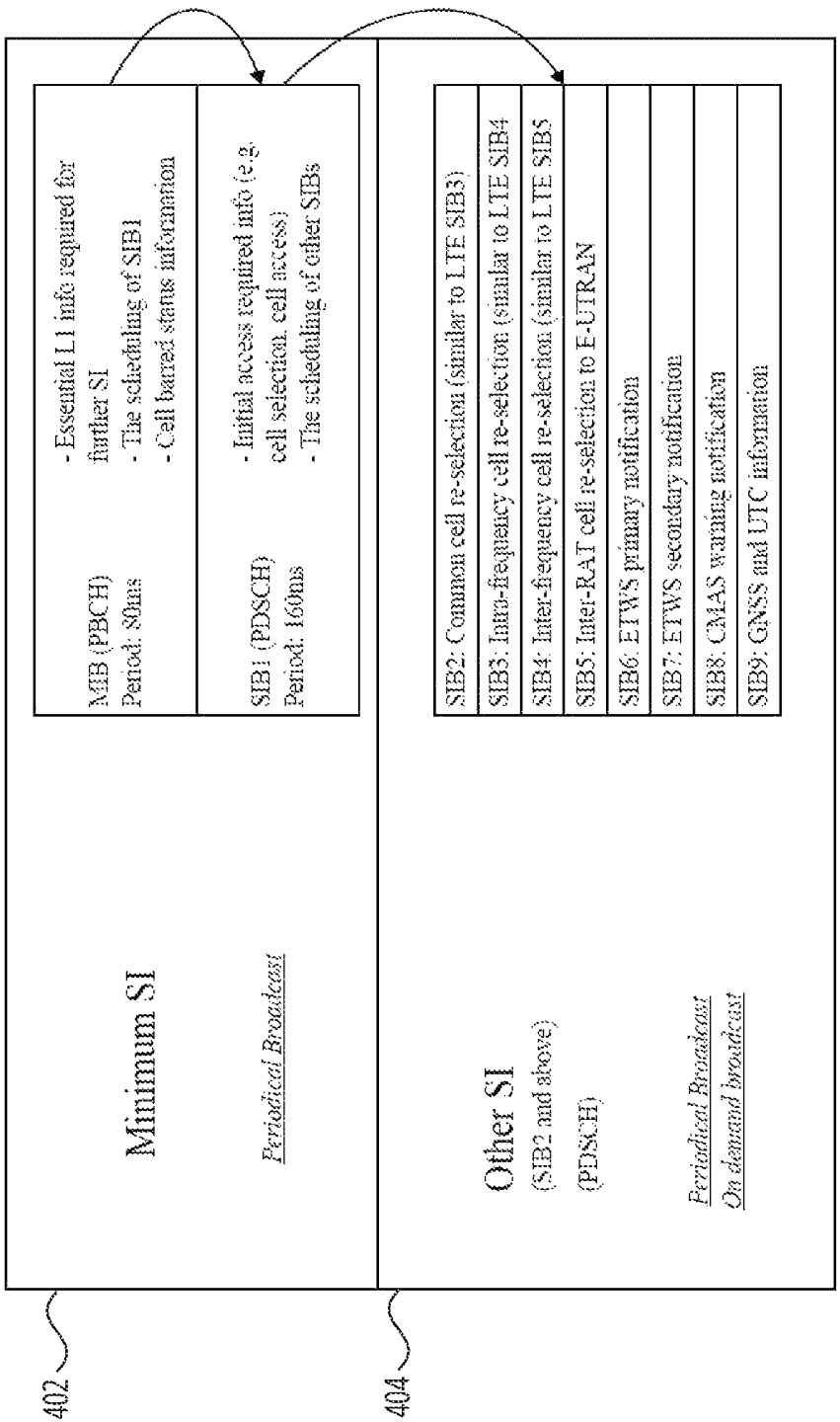
FIG. 4 illustrates an RRC system information structure in accordance with one embodiment.

FIG. 4 is a block diagram illustrating an RRC system information (SI) structure, according to certain embodiments. Minimum SI 402 is periodically broadcast by the base station (e.g., the gNB 302 shown in FIG. 3) and includes a master information block (MIB) and a system information block 1 (SIB1). The base station broadcasts the MIB on a physical broadcast channel (PBCH) at, for example, a period of 80 milliseconds (ms). The MIB includes essential layer 1 (L1) information required for further SI provisioning, such as the scheduling of the SIB1 and cell barred status information. Persons skilled in the art will recognize from the disclosure herein that an RRC message comprising the MIB may include parameters such as systemFrameNumber, subCarrierSpacingCommon, ssb-SubcarrierOffset, dmrs-TypeA-Position, pdcch-ConfigSIB1, cellBarred, and/or intraFreqReselection. The base station broadcasts the SIB1 on a physical downlink shared channel (PDSCH) at, for example, a period of 160 ms. The SIB1 includes initial access required information (e.g., cell selection, cell access, etc.) and provides scheduling of other system information blocks (SIBs) in the Other SI 404. Thus, as illustrated by the arrows, a UE uses the MIB to acquire the SIB1 and uses the SIB1 to acquire SIB2 and above in the Other SI 404.

The Other SI 404 provides parameters in, for example, SIB2 for common cell re-selection, SIB3 for intra-frequency cell re-selection, SIB4 for inter-frequency cell re-selection, SIB5 for inter radio access technology (RAT) cell re-selection to E-UTRAN, SIB6 for Earthquake and Tsunami Warning System (ETWS) primary notification, SIB7 for ETWS secondary notification, SIB8 for Commercial Mobile Alert Service (CMAS) warning notification, and/or SIB9 for Global Navigation Satellite System (GNSS) and Universal Time Coordination (UTC) information. The base station may periodically broadcast the Other SI 404 or may provide the Other SI 404 on demand.

Figure 5A:
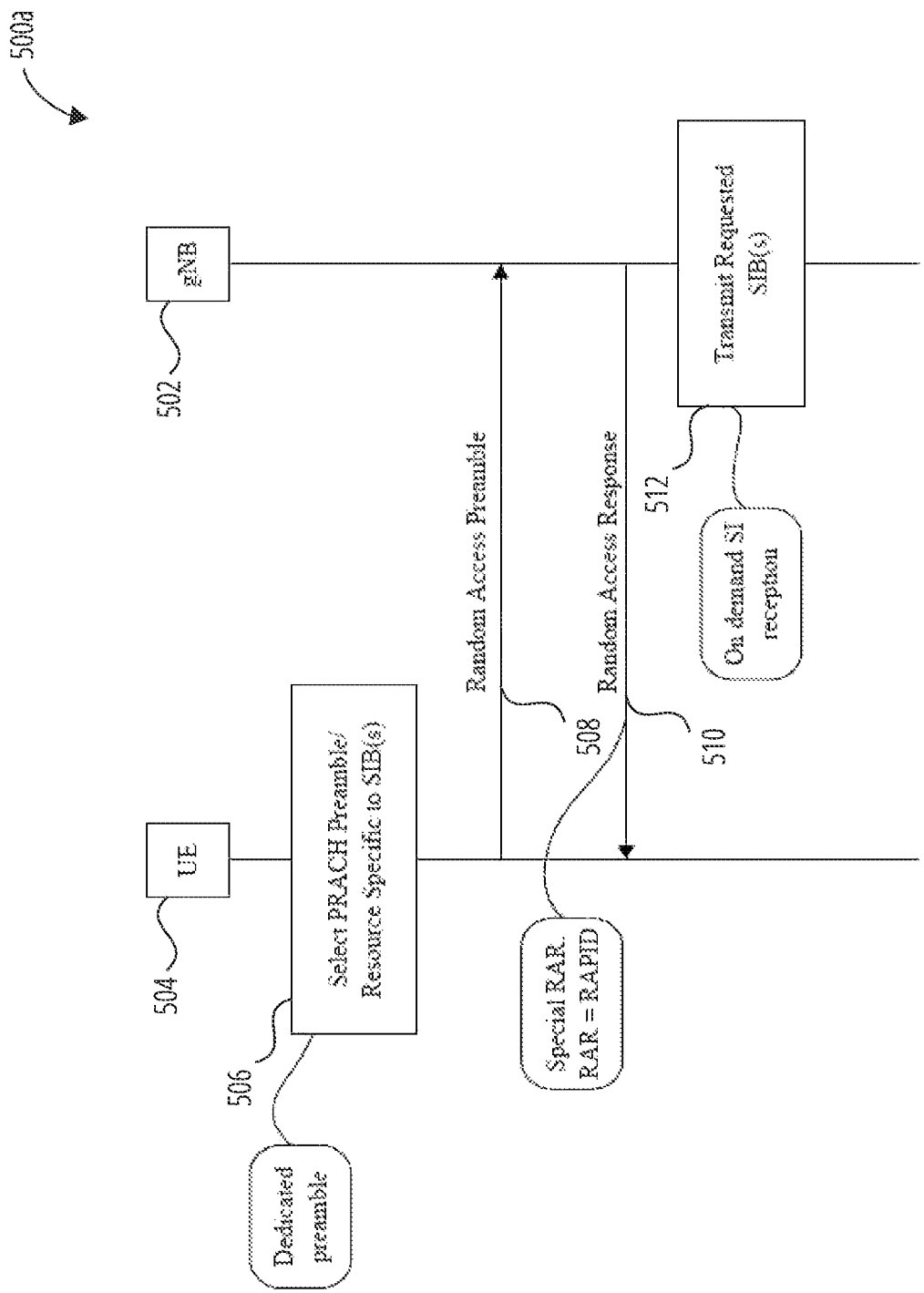
FIG. 5A illustrates RRC on demand SI provisioning in accordance with one embodiment.
Figure 5B:
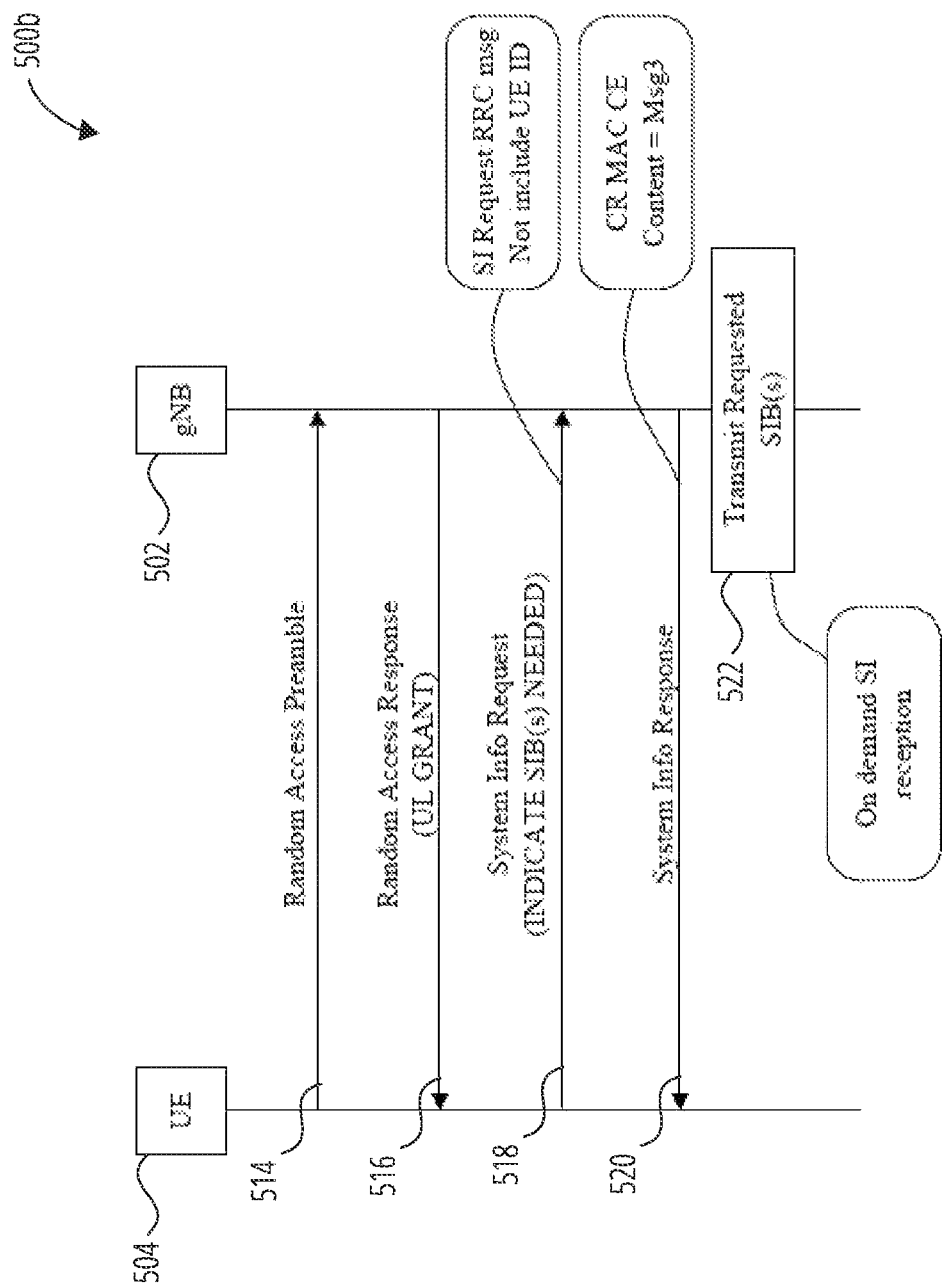
FIG. 5B illustrates RRC on demand SI provisioning in accordance with another embodiment.

FIG. 5A and FIG. 5B are diagrams illustrating on demand SI transmission from a gNB 502 (or other base station) to a UE 504 in an RRC idle state or an RRC inactive state, according to certain embodiments. FIG. 5A shows an RRC on demand SI provisioning 500a using a Msg1 based SI request and FIG. 5B shows an RRC on demand SI provisioning 500b using a Msg3 based SI request.

An RRC configuration for the Msg1 based SI request may include:

```
SI-RequestConfig ::=
    rach-OccassionsSI
      rach-ConfigSI
        ssb-perRACH-Occassion
    }
    si-RequestPeriod
    si-RequestResources
}
```

An RRC configuration for the Msg3 based SI request may include:

In the Msg1 based SI request shown in FIG. 5A, the UE 504 selects 506 a physical random access channel (PRACH) preamble and resource specific to requested SIB(s). The UE 504 then sends the random access preamble 508 with the dedicated preamble to the gNB 502. The gNB 502 then generates a random access response 510. The random access response 510 may be a special random access response (RAR) with a random access preamble identifier (RAPID) corresponding to the UE 504. The gNB 502 then transmits 512 the requested SIB(s) such that the UE 504 can perform on demand SI reception.

In the Msg3 based SI request shown in FIG. 5B, the UE 504 sends a random access preamble 514 to the gNB 502 and receives a random access response 516 comprising an uplink (UL) grant. The UE 504 uses the UL grant to send a system information request 518 to indicate the SIB(s) needed or requested from the gNB 502. The system information request 518 may be included in an RRC message that does not include a UE identifier (ID). The gNB 502 responds to the system information request 518 with a system information response 520 wherein the CR MAC control element (CE) includes a content parameter set to Msg3. The gNB 502 then transmits 522 the requested SIB(s) such that the UE 504 can perform on demand SI reception.

For either the Msg1 based SI request shown in FIG. 5A or the Msg3 based SI request shown in FIG. 5B, or both, the network may broadcast the requested SI at a configurable periodicity and for a certain duration.

Figure 6:
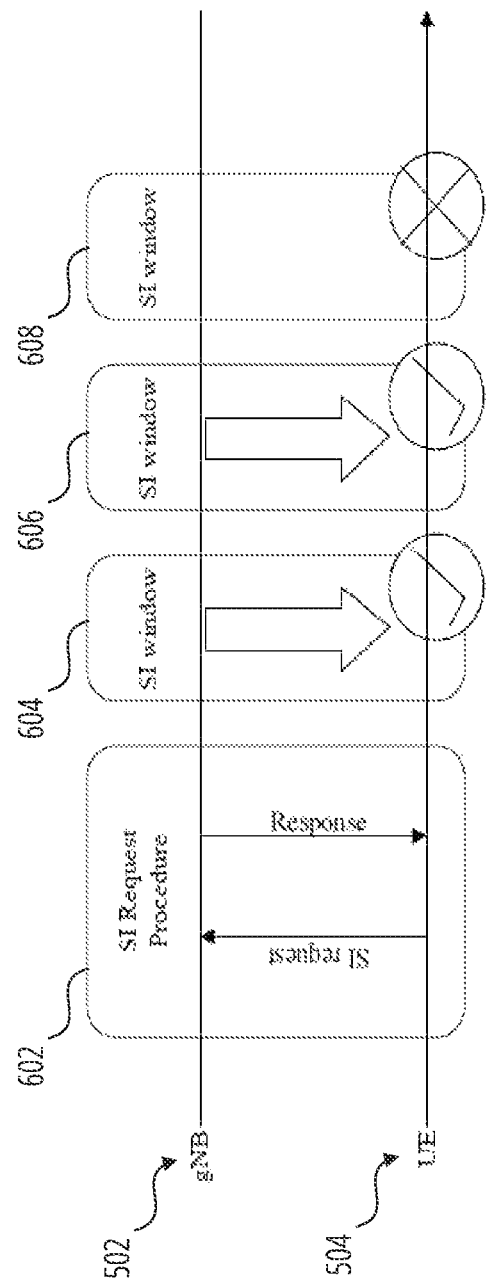
FIG. 6 illustrates broadcast of on demand SI in accordance with one embodiment.

For example, FIG. 6 is a block diagram illustrating broadcast of on demand SI, according to certain embodiments. After the gNB 502 and the UE 504 perform an SI request procedure 602 (e.g., the RRC on demand SI provisioning 500a shown in FIG. 5A or the RRC on demand SI provisioning 500b shown in FIG. 5B), the gNB 502 periodically broadcasts the requested SI in SI windows to the UE 504. In this example, the gNB 502 broadcasts the requested SI for a duration of time that corresponds to two SI windows. In other words, the gNB 502 broadcasts the requested SI in a first SI window 604 and a second SI window 606, but not in a third SI window 608.

Figure 7:
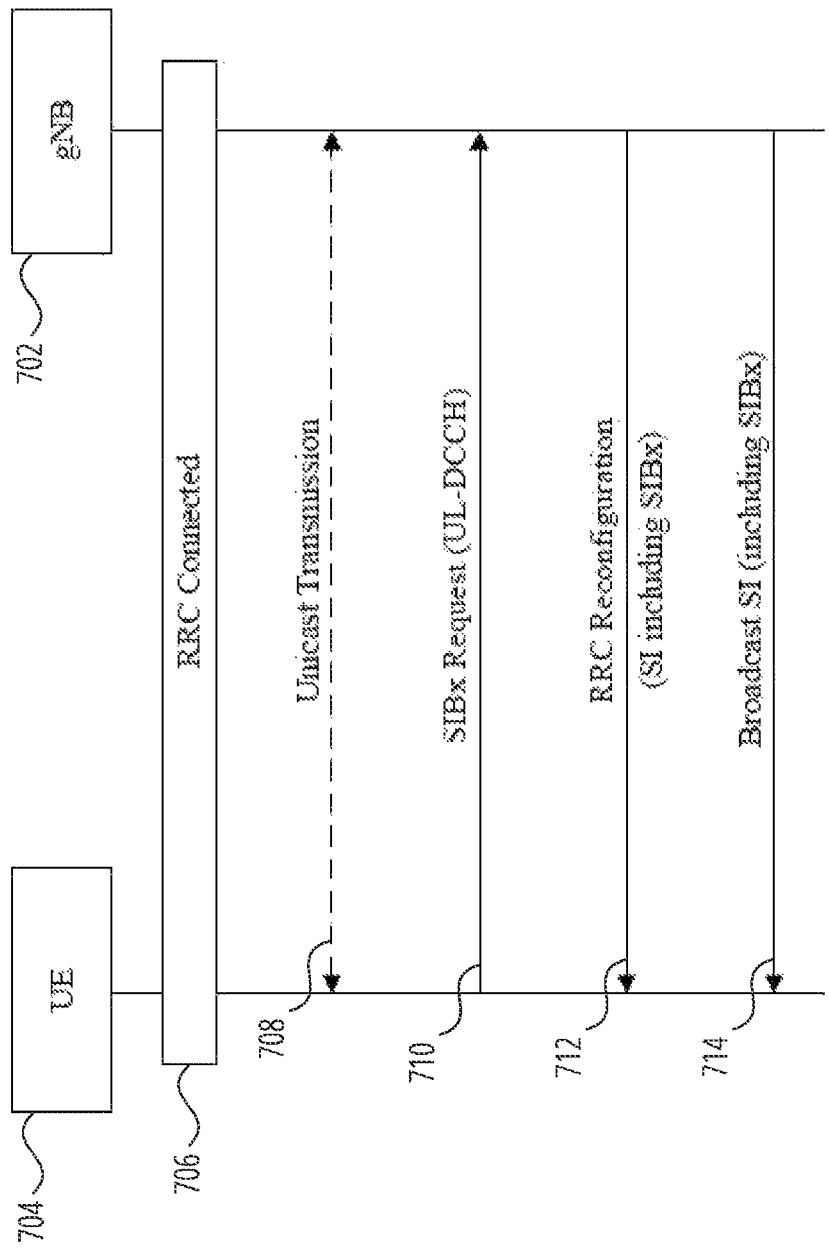
FIG. 7 illustrates on demand SI transmission from a gNB to a UE in an RRC connected state in accordance with one embodiment.

FIG. 7 is a diagram illustrating on demand SI transmission from a gNB 702 (or other base station) to a UE 704 in an RRC connected state, according to certain embodiments. After the UE 704 enters an RRC connected state 706 with the gNB 702, the gNB 702 and the UE 704 may communicate with one another using unicast transmissions 708. The UE 704 may send an SIBx request 710 to the gNB 702, where the SIBx comprises requested system information (e.g., one or more of SIB2-SIB9, or portions thereof). The SIBx request 710 may be sent in an uplink dedicated control channel (UL-DCCH). In response, the gNB 702 may send an RRC reconfiguration message 712 to the UE 704. The RRC reconfiguration message 712 comprises SI including the requested system information (SIBx). In addition, or in other embodiments, the gNB 702 may broadcast SI 714 including the SIBx to the UE 704.

```
SchedulingInfo ::=      SEQUENCE {
    si-BroadcastStatus      ENUMERATED {broadcasting, notBroadcasting},
    si-Periodicity          ENUMERATED {RF8, RF16, RF32, RF64, RF128,
RF256, RF512},
    SIB-MappingInfo         SIB-Mapping
}
```

FIG. 8 illustrates a table 800 showing differences in on demand SI acquisition between 3GPP release 15 (Rel-15) design and release 16 (Rel-16) enhancement. For UE requested on demand SI acquisition, Rel-15 design provides support for idle/inactive UEs, Msg1/Msg3 (common control channel (CCH)) based requests, and/or per SI requests. Rel-16 systems provide support for UE requested on demand SI acquisition for RRC connected UEs, DedicatedSIBRequest message (DCCH) based requests, and/or per SIB requests.

For network (NW) provisioning of on demand SI acquisition, table 800 shows that the Rel-15 design supports NW provision via broadcast only, whereas the Rel-16 enhancement supports NW provision via broadcast and/or via RRCReconfiguration if no common search space (CSS) is configured on the activated bandwidth part (BWP).

Current systems do not provide for an L2 UE-to-NW relay to efficiently provide SI to a remote UE. An out of coverage UE cannot directly obtain SI from a gNB. Further, UEs in the edge of a cell may not be able to reliably decode SI broadcast from the gNB. Further, a remote UE in a first cell may want to connect to a relay UE in a second cell (neighboring cell). Thus, to allow the remote UE to retrieve the system information from the gNB, it is desirable that the relay UE forwards the system information to the remote UE. The remote UE may then be able to perform operations such as tracking area update, RAN based notification area (RNA) update, cell camping, cell access, etc. However, a problem with current wireless systems is that, while a relay UE may acquire SI simply by following current NR Uu procedures, re-broadcasting the SI adds to the power consumption of the relay UE. Further, a remote UE may not be known by a relay UE unless they are PC5-connected (i.e., through a sidelink communication channel). Thus, the relay UE may be unaware that SI, or which SI, is needed by the remote UE.

Accordingly, certain embodiments herein provide ways to reduce the SI information that is forwarded from the relay UE to the remote UE. For example, certain embodiments only forward essential SI based on the state of the remote UE.

For example, FIG. 9 illustrates a table 900 of various embodiments disclosed herein for L2 relay of SI based on the remote UE's state, in one embodiment discussed below (Case 1), when the remote UE is in an out of coverage (OOC) state, an RRC idle state, or an RRC inactive state with respect to a base station, and the remote UE is not RRC connected to the relay UE via the PC5 interface, the relay UE may broadcast unsolicited SI that the remote use may receive and decode.

In another embodiment discussed below (Case 2), when the remote UE is in an RRC idle state or an RRC inactive state with respect to the base station, and the remote UE is RRC connected to the relay UE via the PC5 interface, the remote UE may solicit SI from the relay UE. In one such embodiment (option 1), the remote UE uses PC5-RRC signaling to solicit the SI from the relay UE. After the relay obtains the requested SI from stored SI in a memory device or from the base station (e.g., gNB), the relay UE forwards the requested SI or a portion of the requested SI to the remote UE. In another embodiment (option 2), the remote UE, first enters into an RRC connected state with the base station and triggers on-demand SI retrieval, as discussed (in Case 3) below.

In another embodiment discussed below (Case 3), when the remote UE is in an RRC connected state with the base station and in an RRC connected state with the relay UE via the PC5 interface, and the relay UE is in an RRC connected state with the base station, the remote UE may solicit SI from the relay UE. The remote UE, may use, for example, a DedicatedSIBRequest to trigger on-demand SI retrieval (e.g., same as the support of relaying of other RRC procedures). The base station (e.g., gNB) may deliver the requested SI or a portion of the requested SI via an RRCReconfiguration message (i.e., dedicated signaling) to the remote UE.

In Case 1, the remote UE is not connected to any relay. In certain such situations, the remote UE may be OOC of the base station (otherwise the remote UE may obtain the SI directly from the base station). The remote UE may also be in an RRC idle state or an RRC inactive state. Many parameters in SI may not be useful to the OOC remote UE, such as RACH-related configurations. However, some information may be useful to the remote UE (e.g., cell ID, access control, etc.). Thus, certain embodiments herein selectively provide certain information of minimum system information (MSI) to the remote UE.

For the remote UE to obtain MSI, according to a first option, the relay UE may re-broadcast the MSI or a subset of the MSI. In a second option, the remote UE may use a new broadcast-based procedure to solicit the MSI (or a subset of the MSI) without a PC5-RRC connection and without security protection (e.g., using a request-response approach). In certain embodiments, if the first option is supported, then the second option may also be considered (e.g., like model A or model B discovery via sidelink (SL) broadcast). In a third option, the remote UE may first connect to the relay UE, and then use a PC5-RRC message to solicit the MSI (the remote UE moves to Case 2 discussed below).

Re-broadcasting the MSI is feasible because an in-coverage (IC) relay UE is able to receive the MSI (MIB and SIB1) from the base station via the Uu interface. In certain embodiments, the relay UE selects which information included in the MSI to broadcast to remote UEs.

For example, FIG. 10 illustrates a table 1000 showing which MSI parameters a relay UE may select to re-broadcast, according to one embodiment. Upper layer related 1002 parameters selected by the relay UE (as indicated by the check marks) may include, for example, public land mobile network (PLMN) identity information (e.g., cell ID, tracking area code (TAC), RNA area), emergency call (eCall) over Internet Protocol Multimedia Subsystem (IMS) support (eCallOverIMS), unified access control (UAC) barring information, IMS emergency support, Positioning System Information Block (posSIB) mapping table, and connection establishment failure control information. In certain embodiments, the relay UE may also select a system frame number (SFN) from L1-related 1004 parameters to re-broadcast. However, the relay may decide not to re-broadcast certain parameters from the L1-related 1004 such as timing advance (TA), subcarrier spacing, random access channel (RACH) configuration, and SI scheduling information.

In certain embodiments, the relay UE may combine broadcasting of the MSI or a subset of the MSI with relay announcement discovery messages (e.g., the MSI broadcast windows and relay announcement discovery messages may share the same periodicity). For example, the combination can also be done by creating the discovery message which encloses the MSI information or selected MSI information of the relay UE's serving cell as part of the auxiliary information of the relay announcement.

In certain embodiments, the relay UE only includes the following parameters from SIB1 in the subset of MSI broadcast to remote UEs: cell access related information (cellAccessRelatedInfo), Internet Protocol Multimedia Subsystem (IMS) support (ims-EmergencySupport), emergency call (eCall) over IMS support (eCallOverIMS-Support), UE timers and constants (ue-TimersAndConstants), unified access control (UAC) barring information (uac-BarringInfo), use full resume identifier (useFullResumeID), UAC access category 1 selection assistance information (UAC-AccessCategory1-SelectionAssistanceInfo), and cell access related information (CellAccessRelatedInfo). Other parameters from SIB1 that are related to the Uu interface resource configuration may not be needed by the remote UE and are not selected by the relay for re-broadcasting with the subset of MSI.

In addition, or in other embodiments, the relay UE may include all parameters from at least one of vehicle-to-everything (V2X) SIB(s), an Earthquake and Tsunami Warning System (ETWS) SIB, and a Commercial Mobile Alert Service (CMAS) SIB received from the base station in the subset of the MSI for the broadcast message to the remote UEs.

In certain embodiments, the relay UE includes cell-barred information (the cellBarred parameter in the MIB) as part of essential information forwarded to the remote UE. In other embodiments, however, when the relay UE is camped on a cell which is barred, the relay UE does not need to announce itself as a viable relay. Therefore, the relay UE does not include the cellBarred parameter in the subset of MSI.

In addition to being included in the MIB, the SFN may also be carried in a sidelink synchronization block (S-SSB). However, S-SSB may not always be transmitted. For example, S-SSB may only be transmitted when active SL communication is ongoing. Thus, in certain embodiments, the systemFrameNumber parameter from the MIB is included in the subset of MSI broadcast to the remote UE by the relay UE.

In certain embodiments, the relay UE may determine that a subset of the OSI is essential or useful for a remote UE. For example, the relay UE may select at least portions of SIB6, SIB7 and/or SIB8, including ETWS and CMAS information, to broadcast to the remote UEs. However, when the relay UE does not provide NR or LTE V2X SIB(s), the remote UE may follow the configuration from the Preconfiguration message. In certain embodiments, an unsolicited method is used wherein the relay UE re-broadcasts OSI or a subset of the OSI. However, re-broadcasting the OSI may use too much overhead for the relay UE. Thus, in other embodiments, an on-demand method is used wherein the remote UE solicits OSI or a subset of the OSI from the relay UE.

Figure 11:
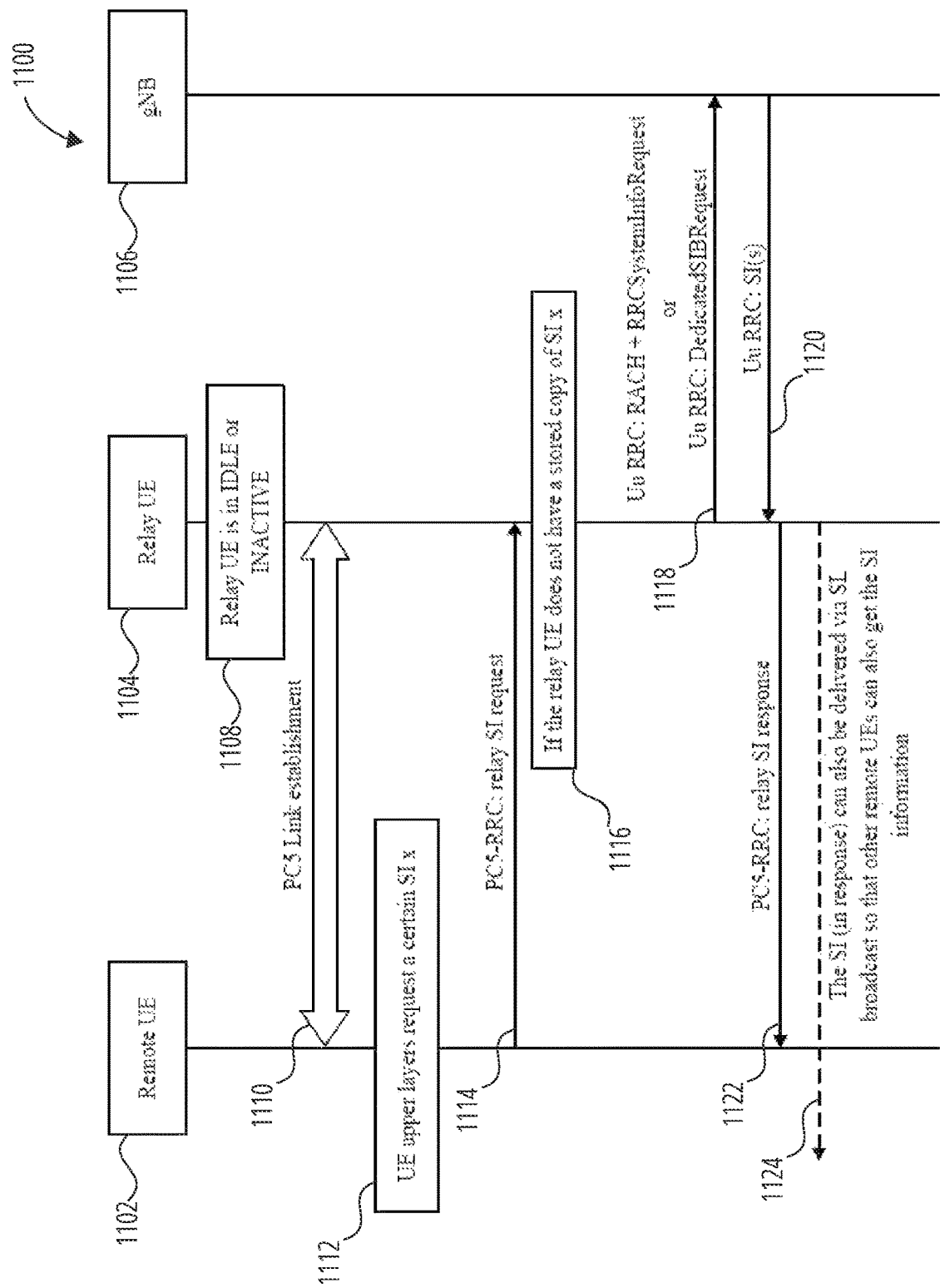
FIG. 11 illustrates RRC on demand SI provisioning in accordance with one embodiment.

FIG. 11 is a diagram illustrating RRC on demand SI provisioning 1100 when a remote UE 1102 is in an RRC idle state or an RRC inactive state with respect to a gNB 1106 (or other base station), and the remote UE 1102 is PC5-RRC connected to a relay UE 1104 via the PC5 interface (Case 2 discussed above), according to certain embodiments. As shown in FIG. 11, the relay UE 1104 may be in an idle or inactive state 1108 when PC5 link establishment 1110 is performed between the remote UE 1102 and the relay UE 1104. In response to UE upper layers requesting 1112 a certain SI (shown as requested SI x), the remote UE 1102 sends a PC5-RRC message to the relay UE 1104 comprising a relay SI request 1114.

The relay UE 1104 may have a stored copy of the requested SI x (e.g., in an internal memory device) that can be sent to the remote UE 1102 in response to the relay SI request 1114. However, as shown starting at block 1116 of FIG. 11, if the relay UE 1104 does not have a stored copy of the requested SI x, the relay UE 1104 may obtain the requested SI x or a subset of the requested SI x from the gNB 1106 using dedicated Uu RRC messaging. For example, the relay UE 1104 may trigger an idle/inactive on-demand SI request procedure (see FIG. 5A and FIG. 5B) including a RACH procedure and sending a Uu RRC message 1118 comprising an RRCSystemInfoRequest to the gNB 1106. Or, if the relay UE 1104 enters an RRC connected state with the gNB 1106, the relay UE 1104 may send a Uu RRC message 1118 comprising a DedicatedSIBRequest to the gNB 1106.

The gNB 1106 sends a Uu RRC response 1120 to the relay UE 1104 comprising SI(s), including the requested SI x or a subset of the requested SI x. The relay UE 1104 then sends the requested SI x or a subset of the requested SI x in a PC5-RRC message comprising a relay SI response 1122. In addition, or in other embodiments, the requested SI x or a subset of the requested SI x may be delivered via SL broadcast 1124 so that other remote UEs can also get the SI information (e.g., without necessarily being connected to the relay UE 1104 through the PC5 link).

In other embodiments, when a remote UE is RRC connected to a gNB and is also connected to a relay UE through a sidelink communication channel (e.g., PC5), as discussed in Case 3 above, the remote UE may solicit SI from the gNB or the relay UE. In NR Uu, a connected UE can either monitor an SI window for a "broadcast" or received it via RRCReconfiguration. It may be up to the gNB to decide which approach is used. In certain L2 relay embodiments disclosed herein, however, only the gNB responds to a requests for SI from a connected remote UE with dedicated signaling. The relay UE may not be aware of end-to-end RRC signaling and does not know whether or which remote UE triggers a DedicatedSIBRequest. Further, it may not be proper for the relay UE to re-broadcast every SI broadcast detected in Uu from the gNB. For example, re-broadcasting every SI broadcast detected from the gNB may drain the power of a battery operated relay UE.

In certain embodiments, a relay UE is configured to handle SI modification. The relay UE monitors for SI updates from the base station. In one embodiment, when the relay UE detects that the SI is modified, the relay UE forwards the updated SI to a remote UE. In another embodiment, when the relay UE detects that the SI is modified, the relay UE sends an indication to the remote UE of the SI modification. In response, the remote UE may solicit the SI again to obtain the updated SI. This is similar to, for example, paging via relay solutions.

Figure 12:
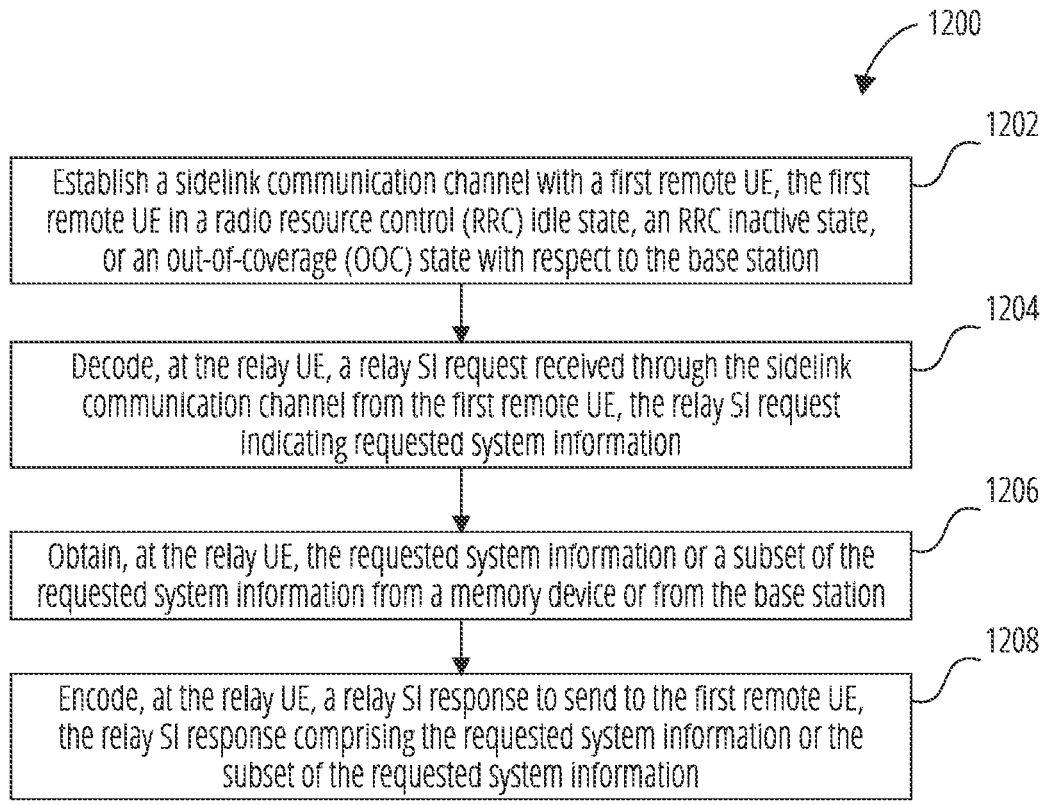
FIG. 12 illustrates a method or a relay UE to provide SI from a base station in a wireless network to one or more remote UEs in accordance with one embodiment.

FIG. 12 is a flowchart illustrating a method 1200 for a relay UE to provide SI from a base station in a wireless network to one or more remote UEs. In block 1202, the method 1200 includes establishing a sidelink communication channel with a first remote UE. The first remote UE is in an RRC idle state, an RRC inactive state, or an out-of-coverage (OOC) state with respect to the base station. In block 1204, method 1200 includes decoding, at the relay UE, a relay SI request received through the sidelink communication channel from the first remote UE. The relay SI request indicates requested system information. In block 1206, the method 1200 includes obtaining, at the relay UE, the requested system information or a subset of the requested system information from a memory device or from the base station. In block 1208, the method 1200 includes encoding, at the relay UE, a relay SI response to send to the first remote UE. The relay SI response comprises the requested system information or the subset of the requested system information.

In certain embodiments, the method 1200 further includes sending the relay SI response to the first remote UE using dedicated RRC signaling through the sidelink communication channel. In other embodiments, the relay SI response is sent to the first remote UE using a sidelink broadcast channel.

In certain embodiments, obtaining the requested system information includes determining that the relay UE has a current or updated copy of the requested system information or the subset of the requested system information stored in the memory device, and obtaining the current or updated copy of the requested system information or the subset of the requested system information from the memory device.

In certain embodiments, obtaining the requested system information includes determining that the relay UE does not have a current or updated copy of the requested system information stored in the memory device. If the relay UE is in the RRC idle state or the RRC inactive state with respect to the base station, the relay UE triggers a RACH-based on-demand system information procedure (e.g., RRCSystemInfoRequest) to obtain the requested system information or the subset of the requested system information from the base station. If the relay UE is in an RRC connected state with the base station, the relay UE uses a dedicated SIB request (e.g., DedicatedSIBRequest) to obtain the requested system information or the subset of the requested system information from the base station.

In certain embodiments, the method 1200 further includes generating a broadcast message to send to one or more second remote UEs through a sidelink broadcast channel. The broadcast message includes MSI or a subset of the MSI, the one or more second remote UEs not PC5-RRC connected to the relay UE. The relay UE may periodically broadcast the broadcast message comprising the MSI or the subset of MSI with a same periodicity as that of a relay announcement discovery message broadcast by the relay UE. The relay UE can also enclose the MSI information or selected MSI information of the relay UE's serving cell as part of the auxiliary information of the relay announcement discovery message. In other embodiments, instead of periodically broadcasting voluntarily, the relay UE may only broadcast the broadcast message including the MSI or the subset of MSI in response to a request from the one or more second remote UEs without a sidelink RRC connection and without security protection.

In certain embodiments, the relay UE selects one or more parameters to include in the subset of the MSI for the broadcast message, the one or more parameters selected from a group comprising public land mobile network (PLMN) identity information, emergency call (eCall) over Internet Protocol Multimedia Subsystem (IMS) support, unified access control (UAC) barring information, IMS emergency support. Positioning System Information Block (posSIB) mapping table, connection establishment failure control information, and system frame number.

In certain embodiments, the MSI comprises a master information block (MIB) and a system information block 1 (SIB1), and wherein the relay UE includes only one or more of the following SIB1 parameters in the subset of the MSI for the broadcast message: cell access related information, Internet Protocol Multimedia Subsystem (IMS) support, emergency call (eCall) over IMS support, UE timers and constants, unified access control (UAC) barring information, use full resume identifier (useFullResumeID), UAC access category 1 selection assistance information, and cell access related information. The relay UE may further include all parameters from at least one of a V2X SIB, an Earthquake and Tsunami Warning System (ETWS) SIB, and a Commercial Mobile Alert Service (CMAS) SIB received from the base station in the subset of the MSI for the broadcast message. In certain embodiments, the relay UE further includes at least one of a cell barred parameter and a system frame number from the MIB in the subset of the MSI for the broadcast message.

In certain embodiments of the method 1200, the relay UE is sidelink RRC connected with a third remote UE, wherein the third remote UE is RRC connected with the base station, and wherein the relay UE performs layer 2 (L2) relay operations for end-to-end RRC signaling between the base station and the third remote UE but does not respond to a dedicated system information block (SIB) request from the third UE to the base station with a separate sidelink dedicated signaling response and does not re-broadcast every SI broadcast detected from the base station.

In certain embodiments, the method 1200 further includes monitoring, at the relay UE, for an SI update from the base station, and in response to detecting the SI update, forwarding the SI update or an indication of the SI update to the first remote UE.

Figure 13:
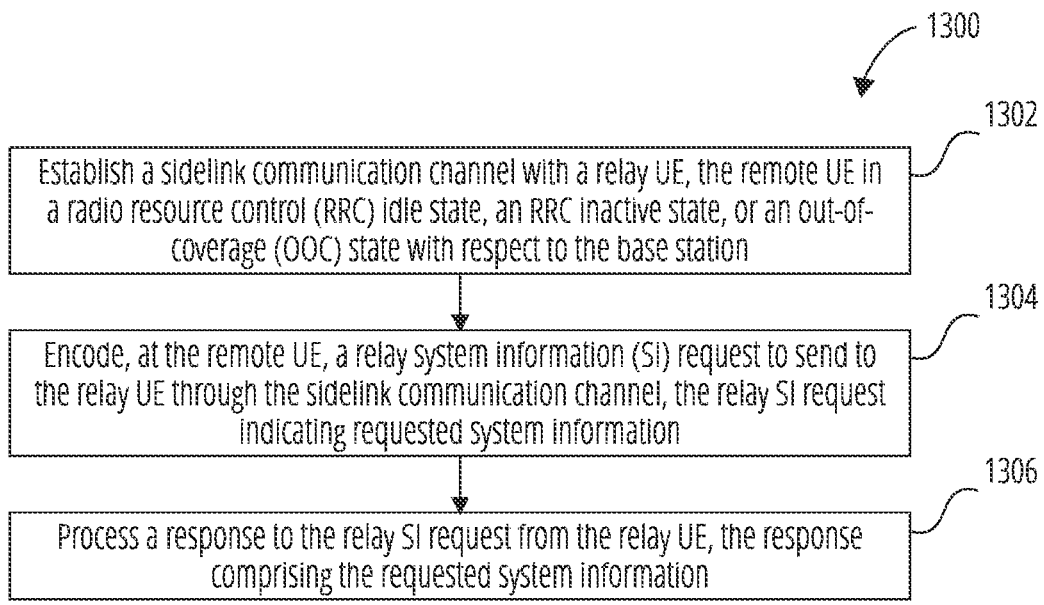
FIG. 13 illustrates a method for a remote UE in accordance with one embodiment.

FIG. 13 is a flowchart illustrating a method 1300 for a remote UE. In block 1302, the method 1300 includes establishing a sidelink communication channel with a relay UE. The remote UE is in an RRC idle state, an RRC inactive state, or an out-of-coverage (OOC) state with respect to the base station. In block 1304, method 1300 includes encoding, at the remote UE, a relay system information (SI) request to send to the relay UE through the sidelink communication channel. The relay SI request indicates requested system information. In block 1306, method 1300 includes processing a response to the relay SI request from the relay UE, the response comprising the requested system information.

In certain embodiments, the method 1300 further includes receiving the requested system information from the relay UE using dedicated RRC signaling through the sidelink communication channel.

In certain embodiments, the method 1300 further includes receiving the requested system information from the relay UE through a sidelink broadcast channel.

In certain embodiments, the method 1300 further includes entering an RRC connected state with the base station, sending an RRC message from the remote UE to the base station via the relay UE, the RRC message comprising a dedicated system information block (SIB) request, and receiving an RRC response message comprising system information from the base station. In certain such embodiments, the method 1300 may further include processing an indication, from the relay UE, of modified system information, and in response to the indication, requesting the modified system information or a portion of the modified system information from the relay UE.

Figure 14:
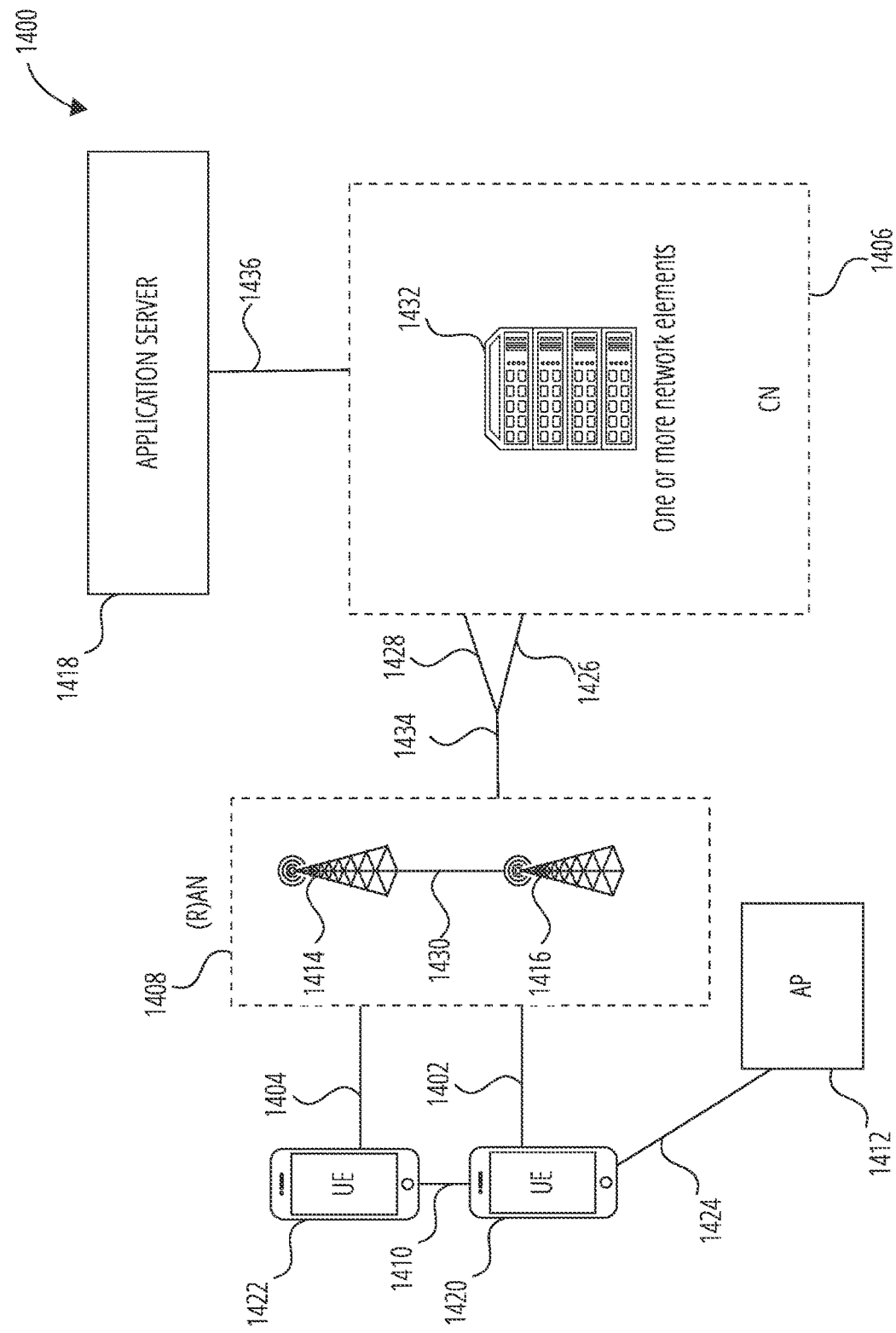
FIG. 14 illustrates a system in accordance with one embodiment.

FIG. 14 illustrates an example architecture of a system 1400 of a network, in accordance with various embodiments. The following description is provided for an example system 1400 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 14, the system 1400 includes UE 1422 and UE 1420. In this example, the UE 1422 and the UE 1420 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1422 and/or the UE 1420 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1422 and UE 1420 may be configured to connect, for example, communicatively couple, with an access node or radio access node (shown as (R)AN 1408). In embodiments, the (R)AN 1408 may be an NG RAN or a SG RAN, an E-UTRAN, or a legacy RAN, such as a UTRAN or GERAN. As used herein, the term "NG RAN" or the like may refer to a (R)AN 1408 that operates in an NR or SG system, and the term "E-UTRAN" or the like may refer to a (R)AN 1408 that operates in an LTE or 4G system. The UE 1422 and UE 1420 utilize connections (or channels) (shown as connection 1404 and connection 1402, respectively), each of which comprises a physical communications interface or layer (discussed in further detail below).

In this example, the connection 1404 and connection 1402 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 1422 and UE 1420 may directly exchange communication data via a ProSe interface 1410. The ProSe interface 1410 may alternatively be referred to as a sidelink (SL) interface 110 and may comprise one or more logical channels, including but not limited to a PSCCH, a PSSCH, a PSDCH, and a PSBCH.

The UE 1420 is shown to be configured to access an AP 1412 (also referred to as "WLAN node," "WLAN," "WLAN Termination," "WT" or the like) via connection 1424. The connection 1424 can comprise a local wireless connection, such as a connection consistent with any IEEE 802.11 protocol, wherein the AP 1412 would comprise a wireless fidelity (Wi-Fi®) router. In this example, the AP 1412 may be connected to the Internet without connecting to the core network of the wireless system (described in further detail below). In various embodiments, the UE 1420, (R)AN 1408, and AP 1412 may be configured to utilize LWA operation and/or LWIP operation. The LWA operation may involve the UE 1420 in RRC_CONNECTED being configured by the RAN node 1414 or the RAN node 1416 to utilize radio resources of LTE and WLAN. LWIP operation may involve the UE 1420 using WLAN radio resources (e.g., connection 1424) via IPsec protocol tunneling to authenticate and encrypt packets (e.g., IP packets) sent over the connection 1424. IPsec tunneling may include encapsulating the entirety of original IP packets and adding a new packet header, thereby protecting the original header of the IP packets.

The (R)AN 1408 can include one or more AN nodes, such as RAN node 1414 and RAN node 1416, that enable the connection 1404 and connection 1402. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 1400 (e.g., an eNB). According to various embodiments, the RAN node 1414 or RAN node 1416 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1414 or RAN node 1416 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1414 or RAN node 1416); a MAC/PHY split wherein RRC, PDCP, RLC, and MAC layers are operated by the CRAN/vBBUP and the PHY layer is operated by individual RAN nodes (e.g., RAN node 1414 or RAN node 1416); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1414 or RAN node 1416 to perform other virtualized applications. In some implementations, an individual RAN node may represent individual gNB-DUs that are connected to a gNB-CU via individual F1 interfaces (not shown by FIG. 14). In these implementations, the gNB-DUs may include one or more remote radio heads or RFEMs, and the gNB-CU may be operated by a server that is located in the (R)AN 1408 (not shown) or by a server pool in a similar manner as the CRAN/vBBUP. Additionally, or alternatively, one or more of the RAN node 1414 or RAN node 1416 may be next generation eNBs (ng-eNBs), which are RAN nodes that provide E-UTRA user plane and control plane protocol terminations toward the UE 1422 and UE

1420, and are connected to an SGC via an NG interface (discussed infra). In V2X scenarios one or more of the RAN node 1414 or RAN node 1416 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 1414 and/or the RAN node 1416 can terminate the air interface protocol and can be the first point of contact for the UE 1422 and UE 1420. In some embodiments, the RAN node 1414 and/or the RAN node 1416 can fulfill various logical functions for the (R)AN 1408 including, but not limited to, radio network controller (RNC) functions such as radio bearer management, uplink and downlink dynamic radio resource management and data packet scheduling, and mobility management.

In embodiments, the UE 1422 and UE 1420 can be configured to communicate using OFDM communication signals with each other or with the RAN node 1414 and/or the RAN node 1416 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1414 and/or the RAN node 1416 to the LIE 1422 and UE 1420, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1422 and UE 1420 and the RAN node 1414 and/or the RAN node 1416 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1422 and UE 1420 and the RAN node 1414 or RAN node 1416 may operate using LAA, eLAA, and/or feLAA mechanisms. In these implementations, the UE 1422 and UE 1420 and the RAN node 1414 or RAN node 1416 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1422 and UE 1420, RAN node 1414 or RAN node 1416, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies, WLAN employs a contention-based channel access mechanism, called CSMA/CA Here, when a WLAN node (e.g., a mobile station (MS) such as UE 1422, AP 1412, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1422 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1422 and UE 1420. The PDCCH carries information about the transport format and resource allocations related to the PDSCH channel, among other things. It may also inform the UE 1422 and UE 1420 about the transport format, resource allocation, and HARQ information related to the uplink shared channel. Typically, downlink scheduling (assigning control and shared channel resource blocks to the UE 1420 within a cell) may be performed at any of the RAN node 1414 or RAN node 1416 based on channel quality information fed back from any of the UE 1422 and UE 1420. The downlink resource assignment information may be sent on the PDCCH used for (e.g., assigned to) each of the UE 1422 and UE 1420.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1414 or RAN node 1416 may be configured to communicate with one another via interface 1430. In embodiments where the system 1400 is an LTE system (e.g., when CN 1406 is an EPC), the interface 1430 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1422 from an SeNB for user data; information of PDCP PDUs that were not delivered to a UE 1422; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1400 is a SG or NR system (e.g., when CN 1406 is an SGC), the interface 1430 may be an Xn interface. The Xn interface is defined between two or more RAN nodes (e.g., two or more gNBs and the like) that connect to SGC, between a RAN node 1414 (e.g., a gNB) connecting to SGC and an eNB, and/or between two eNBs connecting to 5GC (e.g., CN 1406). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1422 in a connected mode (e.g., CM-CONNECTED) including functionality to manage the UE mobility for connected mode between one or more RAN node 1414 or RAN node 1416. The mobility support may include context transfer from an old (source) serving RAN node 1414 to new (target) serving RAN node 1416; and control of user plane tunnels between old (source) serving RAN node 1414 to new (target) serving RAN node 1416. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1408 is shown to be communicatively coupled to a core network-in this embodiment, CN 1406. The CN 1406 may comprise one or more network elements 1432, which are configured to offer various data and telecommunications services to customers/subscribers (e.g., users of UE 1422 and UE 1420) who are connected to the CN 1406 via the (R)AN 1408. The components of the CN 1406 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1406 may be referred to as a network slice, and a logical instantiation of a portion of the CN 1406 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1418 may be an element offering applications that use IP bearer resources with the core network (e.g., UMTS PS domain, LTE PS data services, etc.). The application server 1418 can also be configured to support one or more communication services (e.g., VoIP sessions, PTT sessions, group communication sessions, social networking services, etc.) for the UE 1422 and UE 1420 via the EPC. The application server 1418 may communicate with the CN 1406 through an IP communications interface 1436.

In embodiments, the CN 1406 may be an SGC, and the (R)AN 116 may be connected with the CN 1406 via an NG interface 1434. In embodiments, the NG interface 1434 may be split into two parts, an NG user plane (NG-U) interface 1426, which carries traffic data between the RAN node 1414 or RAN node 1416 and a UPF, and the S1 control plane (NG-C) interface 1428, which is a signaling interface between the RAN node 1414 or RAN node 1416 and AMFs.

In embodiments, the CN 1406 may be a SG CN, while in other embodiments, the CN 1406 may be an EPC). Where CN 1406 is an EPC, the (R)AN 116 may be connected with the CN 1406 via an S1 interface 1434. In embodiments, the S1 interface 1434 may be split into two parts, an S1 user plane (S1-U) interface 1426, which carries traffic data between the RAN node 1414 or RAN node 1416 and the S-GW, and the S1-MME interface 1428, which is a signaling interface between the RAN node 1414 or RAN node 1416 and MMES.

Figure 15:
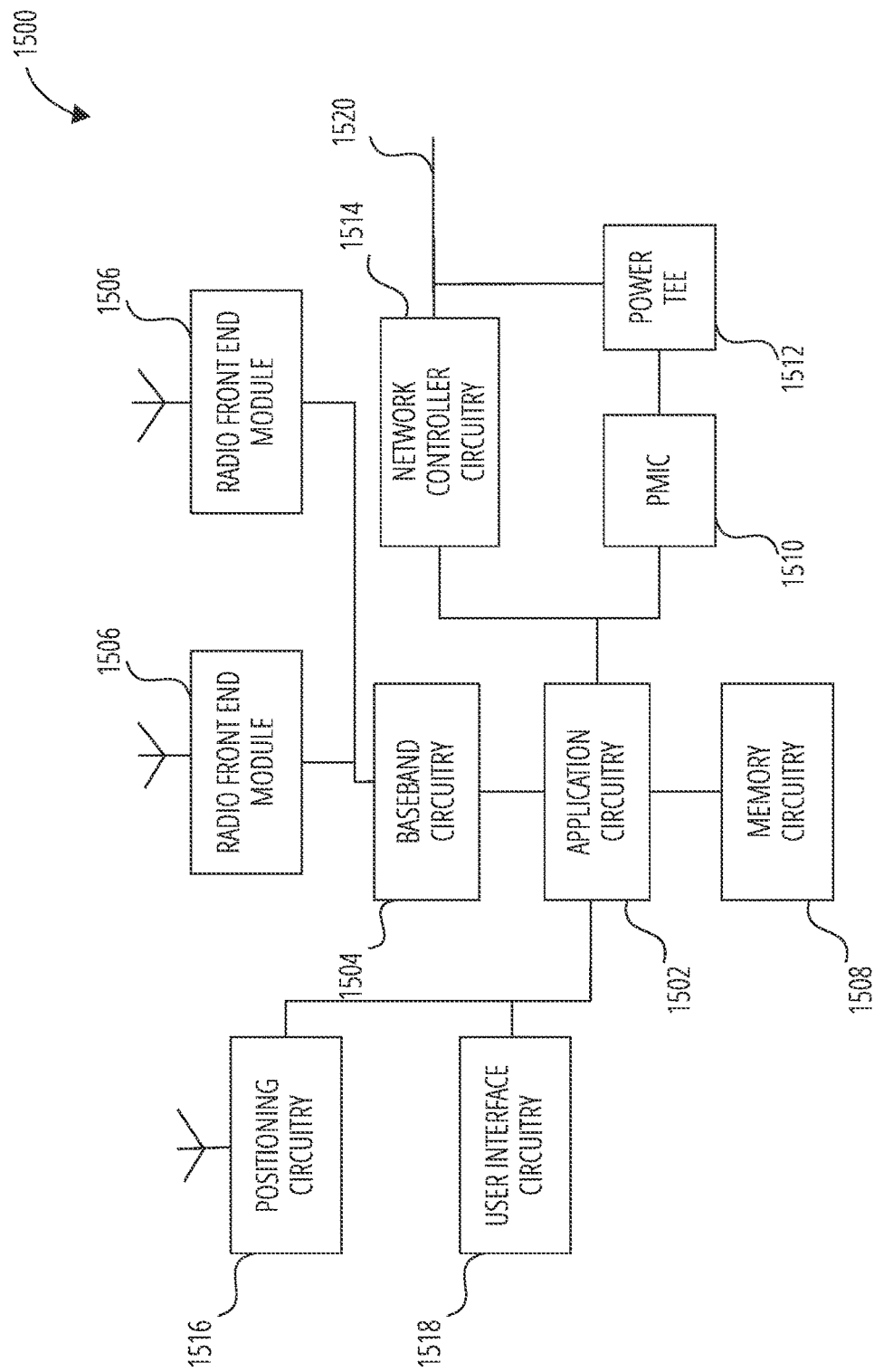
FIG. 15 illustrates an infrastructure equipment in accordance with one embodiment.

FIG. 15 illustrates an example of infrastructure equipment 1500 in accordance with various embodiments. The infrastructure equipment 1500 may be implemented as a base station, radio head, RAN node, AN, application server, and/or any other element/device discussed herein. In other examples, the infrastructure equipment 1500 could be implemented in or by a UE.

The infrastructure equipment 1500 includes application circuitry 1502, baseband circuitry 1504, one or more radio front end module 1506 (RFEM), memory circuitry 1508, power management integrated circuitry (shown as PMIC 1510), power tee circuitry 1512, network controller circuitry 1514, network interface connector 1520, satellite positioning circuitry 1516, and user interface circuitry 1518. In some embodiments, the device infrastructure equipment 1500 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1502 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1502 may be coupled with or may include memory/storage elements and may be configured to execute instructions stored in the memory/storage to enable various applications or operating systems to run on the infrastructure equipment 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1502 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1502 may comprise, or may be, a special-purpose processor/controller to operate according to the various embodiments herein. As examples, the processor(s) of application circuitry 1502 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1500 may not utilize application circuitry 1502, and instead may include a special-purpose processor/controller to process IP data received from an EPC or 5GC, for example.

In some implementations, the application circuitry 1502 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1502 may comprise logic blocks or logic fabric, and other interconnected resources that may be programmed to perform various functions, such as the procedures, methods, functions, etc. of the various embodiments discussed herein. In such embodiments, the circuitry of application circuitry 1502 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitr 1504 may be implemented, for example, as a solder-down substrate including one or more integrated circuits, a single packaged integrated circuit soldered to a main circuit hoard or a multi-chip module containing two or more integrated circuits.

The user interface circuitry 1518 may include one or more user interfaces designed to enable user interaction with the infrastructure equipment 1500 or peripheral component interfaces designed to enable peripheral component interaction with the infrastructure equipment 1500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1506 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1506, which incorporates both mmWave antennas and sub-mmWave.

The memory circuitry 1508 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D)cross-point (XPOINT) memories from Intel® and Micron®. The memory circuitry 1508 may be implemented as one or more of solder down packaged integrated circuits, socketed memory modules and plug-in memory cards.

The PMIC 1510 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1512 may provide for electrical power drawn from a network cable to provide both power supply and data connectivity to the infrastructure equipment 1500 using a single cable.

The network controller circuitry 1514 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1500 via network interface connector 1520 using a physical connection, which may be electrical (commonly referred to as a "copper interconnect"), optical, or wireless. The network controller circuitry 1514 may include one or more dedicated processors and/or FPGAs to communicate using one or more of the aforementioned protocols. In some implementations, the network controller circuitry 1514 may include multiple controllers to provide connectivity to other networks using the same or different protocols.

The positioning circuitry 1516 includes circuitry to receive and decode signals transmitted/broadcasted by a positioning network of a global navigation satellite system (GNSS). Examples of navigation satellite constellations (or GNSS) include United States' Global Positioning System (GPS). Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1516 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1516 may include a Micro-Technology for Positioning, Navigation, and Timing (Micro-PNT) IC that uses a master timing clock to perform position tracking/estimation without GLASS assistance. The positioning circuitry 1516 may also be part of, or interact with, the baseband circuitry 1504 and/or radio front end module 1506 to communicate with the nodes and components of the positioning network. The positioning circuitry 1516 may also provide position data and/or time data to the application circuitry 1502, which may use the data to synchronize operations with various infrastructure, or the like. The components shown by FIG. 15 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 16:
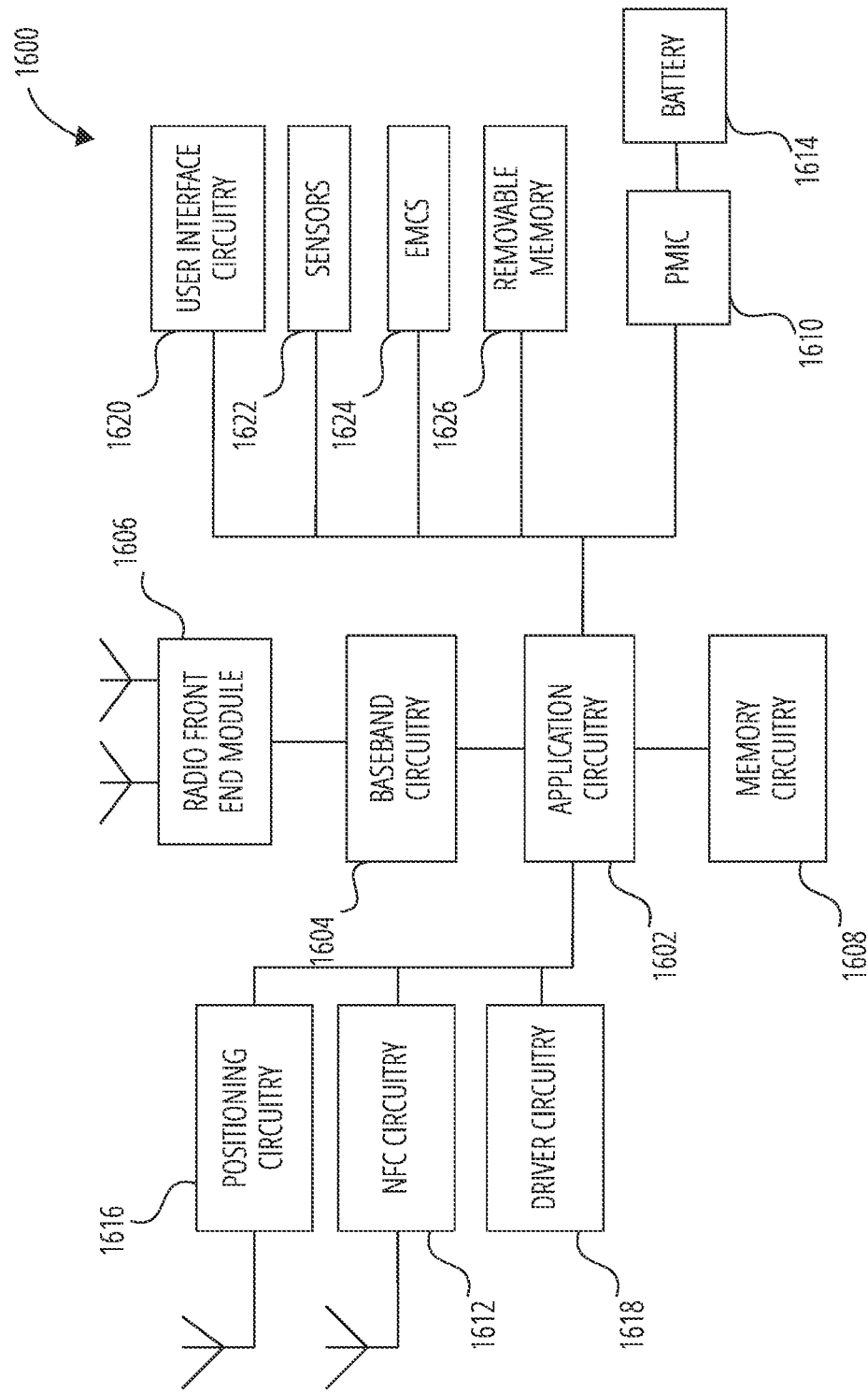
FIG. 16 illustrates a platform in accordance with one embodiment.

FIG. 16 illustrates an example of a platform 1600 in accordance with various embodiments. In embodiments, the computer platform 1600 may be suitable for use as UEs, application servers, and/or any other element/device discussed herein. The platform 1600 may include any combinations of the components shown in the example. The components of platform 1600 may be implemented as integrated circuits (ICs), portions thereof, discrete electronic devices, or other modules, logic, hardware, software, firmware, or a combination thereof adapted in the computer platform 1600, or as components otherwise incorporated within a chassis of a larger system. The block diagram of FIG. 16 is intended to show a high level view of components of the computer platfonn 1600. However, some of the components shown may be omitted, additional components may be present, and different arrangement of the components shown may occur in other implementations.

Application circuitry 1602 includes circuitry such as, but not limited to one or more processors (or processor cores), cache memory, and one or more of LDOs, interrupt controllers, serial interfaces such as SPI, I²C or universal programmable serial interface module, RTC, tuner-counters including interval and watchdog timers, general purpose IO, memory card controllers such as SD MMC or similar, USB interfaces, MIPI interfaces, and JTAG test access ports. The processors (or cores) of the application circuitry 1602 may be coupled with or may include memory/storage elements and may be configured to execute instructions stored in the memory/storage to enable various applications or operating systems to run on the platform 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1602 may include, for example, one or more processor cores, one or more application processors, one or more CPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1602 may comprise, or may be, a special-purpose processor/controller to operate according to the various embodiments herein.

As examples, the processor(s) of application circuitry 1602 may include an Intel® Architecture Core™ based processor, such as a Quark™, an Atom™, an i3, an i5, an i7, or an MCU-class processor, or another such processor available from Intel® Corporation. The processors of the application circuitry 1602 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1602 may be a part of a system on a chip (SoC) in which the application circuitry 1602 and other components are formed into a single integrated circuit, or a single package, such as the Edison™ or Galileo™ SoC boards from Intel® Corporation.

Additionally or alternatively, application circuitry 1602 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1602 may comprise logic blocks or logic fabric, and other interconnected resources that may be programmed to perform various functions, such as the procedures, methods, functions, etc. of the various embodiments discussed herein. In such embodiments, the circuitry of application circuitry 1602 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1604 may be implemented, for example, as a solder-down substrate including one or more integrated circuits, a single packaged integrated circuit soldered to a main circuit board or a multi-chip module containing two or more integrated circuits.

The radio front end module 1606 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1606, which incorporates both mmWave antennas and sub-mmWave.

The memory circuitry 1608 may include any number and type of memory devices used to provide for a given amount of system memory. As examples, the memory circuitry 1608 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1608 may be developed in accordance with a Joint Electron Devices Engineering Council (JEDEC) low power double data rate (LPDDR)-based design, such as LPDDR2, LPDDR3, LPDDR4, or the like. Memory circuitry 1608 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1608 maybe on-die memory or registers associated with the application circuitry 1602. To provide for persistent storage of information such as data, applications, operating systems and so forth, memory circuitry 1608 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1600 may incorporate the three-dimensional (3D) cross-point (XPOINT) memories from Intel® and Micron®.

The removable memory 1626 may include devices, circuitry, enclosures/housings, ports or receptacles, etc. used to couple portable data storage devices with the platform 1600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1600 may also include interface circuitry (not shown) that is used to connect external devices with the platform 1600. The external devices connected to the platform 1600 via the interface circuitry include sensors 1622 and electro-tnechanical components (shown as EMCs 1624), as well as removable memory devices coupled to removable memory 1626.

The sensors 1622 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1624 include devices, modules, or subsystems whose purpose is to enable platform 1600 to change its state, position, and/or orientation, or move or control a mechanism or (sub)system. Additionally, EMCs 1624 may be configured to generate and send messages/signaling to other components of the platform 1600 to indicate a current state of the EMCs 1624. Examples of the EMCs 1624 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1600 is configured to operate one or more EMCs 1624 based on one or more captured events and/or instructions or control signals received from a service provider and/or various clients. In some implementations, the interface circuitry may connect the platform 1600 with positioning circuitry 1616. The positioning circuitry 1616 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1616 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1616 may include a Micro-PNT IC that uses a master timing clock to perform position tracking/estimation without GNSS assistance. The positioning circuitry 1616 may also be part of, or interact with, the baseband circuitry 1604 and/or radio front end module 1606 to communicate with the nodes and components of the positioning network. The positioning circuitry 1616 may also provide position data and/or time data to the application circuitry 1602, which may use the data to synchronize operations with various infrastructure radio base stations), for turn-by-turn navigation applications, or the like.

In some implementations, the interface circuitry may connect the platform 1600 with Near-Field Communication circuitry (shown as NFC circuitry 1612). The NFC circuitry 1612 is configured to provide contactless, short-range communications based on radio frequency identification (RFID) standards, wherein magnetic field induction is used to enable communication between NFC circuitry 1612 and NFC-enabled devices external to the platform 1600 (e.g., an "NFC touchpoint"). NFC circuitry 1612 comprises an NFC controller coupled with an antenna element and a processor coupled with the NFC controller. The NFC controller may be a chip/IC providing NFC functionalities to the NFC circuitry 1612 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1612, or initiate data transfer between the NFC circuitry 1612 and another active NFC device (e.g., a smartphone or an NFC-enabled POS terminal) that is proximate to the platform 1600.

The driver circuitry 1618 may include software and hardware elements that operate to control particular devices that are embedded in the platform 1600, attached to the platform 1600, or otherwise communicatively coupled with the platform 1600. The driver circuitry 1618 may include individual drivers allowing other components of the platform 1600 to interact with or control various input/output (I/O) devices that may be present within, or connected to, the platform 1600. For example, driver circuitry 1618 may include a display driver to control and allow access to a display device, a touchscreen driver to control and allow access to a touchscreen interface of the platform 1600, sensor drivers to obtain sensor readings of sensors 1622 and control and allow access to sensors 1622, EMC drivers to obtain actuator positions of the EMCs 1624 and/or control and allow access to the EMCs 1624, a camera driver to control and allow access to an embedded image capture device, audio drivers to control and allow access to one or more audio devices.

The power management integrated circuitry (shown as PMIC 1610) (also referred to as "power management circuitry") may manage power provided to various components of the platform 1600. In particular, with respect to the baseband circuitry 1604, the PMIC 1610 may control power-source selection, voltage scaling, battery charging, or DC-to-DC conversion. The PMIC 1610 may often be included when the platform 1600 is capable of being powered by a battery 1614, for example, when the device is included in a UE.

In some embodiments, the PMIC 1610 may control, or otherwise be part of, various power saving mechanisms of the platform 1600. For example, if the platform 1600 is in an RRC_Connected state, where it is still connected to the RAN node as it expects to receive traffic shortly, then it may enter a state known as Discontinuous Reception Mode (DRX) after a period of inactivity. During this state, the platform 1600 may power down for brief intervals of time and thus save power. If there is no data traffic activity for an extended period of time, then the platform 1600 may transition off to an RRC_Idle state, where it disconnects from the network and does not perform operations such as channel quality feedback, handover, etc. The platform 1600 goes into a very low power state and it performs paging where again it periodically wakes up to listen to the network and then powers down again. The platform 1600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1614 may power the platform 1600, although in some examples the platform 1600 may be mounted deployed in a fixed location, and may have a power supply coupled to an electrical grid. The battery 1614 may be a lithium ion battery, a metal-air battery, such as a zinc-air battery, an aluminum-air battery, a lithium-air battery, and the like. In some implementations, such as in V2X applications, the battery 1614 may be a typical lead-acid automotive battery.

In some implementations, the battery 1614 may be a "smart battery," which includes or is coupled with a Battery Management System (BMS) or battery monitoring integrated circuitry. The BMS may be included in the platform 1600 to track the state of charge (SoCh) of the battery 1614. The BMS may be used to monitor other parameters of the battery 1614 to provide failure predictions, such as the state of health (SoH) and the state of function (SoF) of the battery 1614. The BMS may communicate the information of the battery 1614 to the application circuitry 1602 or other components of the platform 1600. The BMS may also include an analog-to-digital (ADC) convertor that allows the application circuitry 1602 to directly monitor the voltage of the battery 1614 or the current flow from the battery 1614. The battery parameters may be used to determine actions that the platform 1600 may perform, such as transmission frequency, network operation, sensing frequency, and the like.

A power block, or other power supply coupled to an electrical grid may be coupled with the BMS to charge the battery 1614. In some examples, the power block may be replaced with a wireless power receiver to obtain the power wirelessly, for example, through a loop antenna in the computer platform 1600. In these examples, a wireless battery charging circuit may be included in the BMS. The specific charging circuits chosen may depend on the size of the battery 1614, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1620 includes various input/output (I/O) devices present within, or connected to, the platform 1600, and includes one or more user interfaces designed to enable user interaction with the platform 1600 and/or peripheral component interfaces designed to enable peripheral component interaction with the platform 1600. The user interface circuitry 1620 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1600. The output device circuitry may also include speakers or other audio emitting devices, printer(s), and/or the like. In some embodiments, the sensors 1622 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1600 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 17:
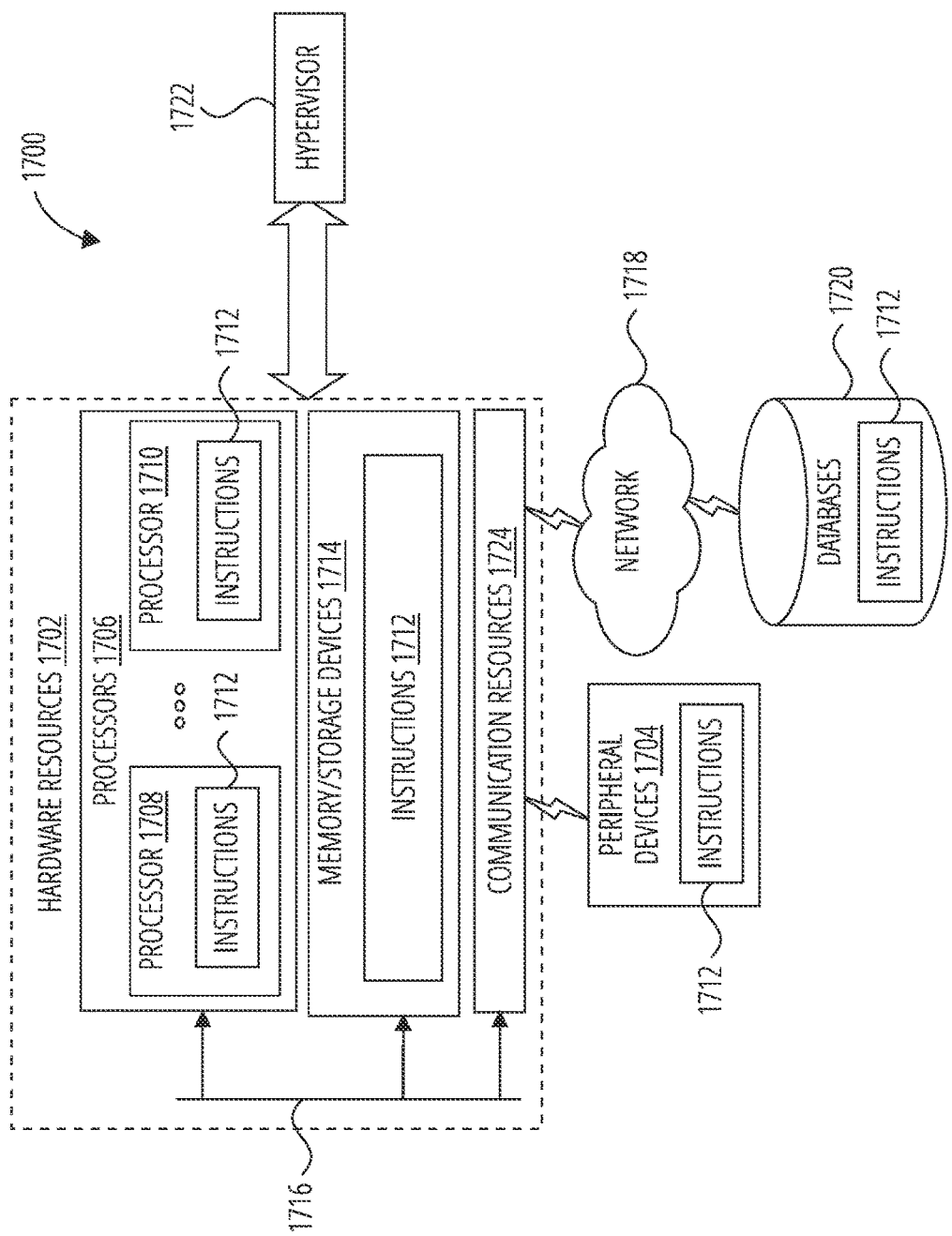
FIG. 17 illustrates components in accordance with one embodiment.

FIG. 17 is a block diagram illustrating components 1700, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1702 including one or more processors 1706 (or processor cores), one or more memory/storage devices 1714, and one or more communication resources 1724, each of which may be communicatively coupled via a bus 1716. For embodiments where node virtualization (e.g., NFV) is utilized, a hypervisor 1722 may be executed to provide an execution environment for one or more network slices/sub-slices to utilize the hardware resources 1702.

The processors 1706 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1708 and a processor 1710.

The memory/storage devices 1714 may include main memory, disk storage, or any suitable combination thereof. The memory/storage devices 1714 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1724 may include interconnection or network interface components or other suitable devices to communicate with one or more peripheral devices 1704 or one or more databases 1720 via a network 1718. For example, the communication resources 1724 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1712 may comprise software, a program, an application, an applet, an app, or other executable code for causing at least any of the processors 1706 to perform any one or more of the methodologies discussed herein. The instructions 1712 may reside, completely or partially, within at least one of the processors 1706 (e.g., within the processor's cache memory), the memory/storage devices 1714, or any suitable combination thereof. Furthermore, any portion of the instructions 1712 may be transferred to the hardware resources 1702 from any combination of the peripheral devices 1704 or the databases 1720. Accordingly, the memory of the processors 1706, the memory/storage devices 1714, the peripheral devices 1704, and the databases 1720 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for a relay user equipment (UE)) to provide system information (SI) from a base station in a wireless network to one or more remote UEs. The method includes: establishing a sidelink communication channel with a first remote UE, the first remote UE in a radio resource control (RRC) idle state, an RRC inactive state, or an out-of-coverage (OOC) state with respect to the base station; decoding, at the relay UE, a relay SI request received through the sidelink communication channel from the first remote UE, the relay SI request indicating requested system information; obtaining, at the relay UE, the requested system information or a subset of the requested system information from a memory device or from the base station; and encoding, at the relay UE, a relay SI response to send to the first remote UE, the relay SI response comprising the requested system information or the subset of the requested system information.

Example 2 includes the method of Example 1, further comprising sending the relay SI response to the first remote UE using dedicated RRC signaling through the sidelink communication channel.

Example 3 includes the method of Example 1, further comprising sending the relay SI response to the first remote UE using a sidelink broadcast channel.

Example 4 includes the method of Example 1, wherein obtaining the requested system information comprises: determining that the relay UE has a current or updated copy of the requested system information or the subset of the requested system information stored in the memory device; and obtaining the current or updated copy of the requested system information or the subset of the requested system information from the memory device.

Example 5 includes the method of Example 1, wherein obtaining the requested system information comprises: determining that the relay UE does not have a current or updated copy of the requested system information stored in the memory device; if the relay UE is in the RRC idle state or the RRC inactive state with respect to the base station, triggering a RACH-based on-demand system information procedure to obtain the requested system information or the subset of the requested system information from the base station; and if the relay UE is in an RRC connected state with the base station, using a dedicated system information block (SIB) request to obtain the requested system information or the subset of the requested system information from the base station.

Example 6 includes the method of Example 1, further comprising generating a broadcast message to send to one or more second remote UEs through a sidelink broadcast channel, the broadcast message comprising minimum system information (MSI) or a subset of the MSI, the one or more second remote UEs not PC5-RRC connected to the relay UE.

Example 7 includes the method of Example 6, further comprising periodically broadcasting, by the relay UE, the broadcast message comprising the MSI or the subset of MSI with a same periodicity as that of a relay announcement discovery message broadcast by the relay UE.

Example 8 includes the method of Example 6, further comprising including the MSI or the subset of MSI in a sideline relay announcement discovery message broadcast by the relay UE.

Example 9 includes the method of Example 6, further comprising only broadcasting the broadcast message comprising the MSI or the subset of MSI in response to a request from the one or more second remote UEs without a sidelink RRC connection and without security protection.

Example 10 includes the method of Example 6, wherein the relay UE selects one or more parameters to include in the subset of the MSI for the broadcast message, the one or more parameters selected from a group comprising public land mobile network (PLMN) identity information, emergency call (eCall) over Internet Protocol Multimedia Subsystem (IMS) support, unified access control (UAC) barring information, IMS emergency support, Positioning System Information Block (posSIB) mapping table, connection establishment failure control information, and system frame number.

Example 11 includes the method of Example 6, wherein the MSI comprises a master information block (MIB) and a system information block 1 (SIB1), and wherein the relay UE includes only one or more of the following SIB1 parameters in the subset of the MSI for the broadcast message: cell access related information, Internet Protocol Multimedia Subsystem (IMS) support, emergency call (eCall) over IMS support, UE timers and constants, unified access control (UAC) barring information, use full resume identifier (useFullResumeID), UAC access category 1 selection assistance information, and cell access related information.

Example 12 includes the method of Example 11, wherein the relay UE further includes all parameters from at least one of a vehicle-to-everything (V2X) system information block (SIB), an Earthquake and Tsunami Warning System (ETWS) SIB, and a Commercial Mobile Alert Service (CMAS) SIB received from the base station in the subset of the MSI for the broadcast messae.

Example 13 includes the method of Example 11, wherein the relay UE includes at least one of a cell barred parameter and a system frame number from the MIB in the subset of the MSI for the broadcast message.

Example 14 includes the method of Example 6, wherein the broadcast message further comprises other system information (OSI) or a subset of the OSI.

Example 15 includes the method of Example 1, wherein the relay UE is sidelink RRC connected with a third remote UE, wherein the third remote UE is RRC connected with the base station, and wherein the relay UE performs layer 2 (L2) relay operations for end-to-end RRC signaling between the base station and the third remote UE but does not respond to a dedicated system information block (SIB) request from the third UE to the base station with a separate sidelink dedicated signaling response and does not re-broadcast every SI broadcast detected from the base station.

Example 16 includes the method of Example 1, further comprising: monitoring, at the relay UE, for an SI update from the base station; and in response to detecting the SI update, forwarding the SI update or an indication of the SI update to the first remote UE.

Example 17 is a method for a remote user equipment (UE). The method includes: establishing a sidelink communication channel with a relay UE, the remote UE in a radio resource control (RRC) idle state, an RRC inactive state, or an out-of-coverage (OOC) state with respect to the base station; encoding, at the remote UE, a relay system information (SI) request to send to the relay UE through the sidelink communication channel, the relay SI request indicating requested system information; and processing a response to the relay SI request from the relay UE, the response comprising the requested system information.

Example 18 includes the method of Example 17, further comprising receiving the requested system information from the relay UE using dedicated RRC signaling through the sidelink communication channel.

Example 19 includes the method of Example 17, further comprising receiving the requested system information from the relay UE through a sidelink broadcast channel.

Example 20 includes the method of Example 17, further comprising: entering an RRC connected state with the base station; sending an RRC message from the remote UE to the base station via the relay UE, the RRC message comprising a dedicated system information block (SIB) request; and receiving an RRC response message comprising system information from the base station.

Example 21 includes the method of Example 20, further comprising: processing an indication, from the relay UE, of modified system information; and in response to the indication, requesting the modified system information or a portion of the modified system information from the relay UE.

Example 22 is a computer-readable storage medium including instructions that, when processed by a computer, configure the processor to perform the method of any of Example 1 to Example 21.

Example 23 is a computing apparatus including a processor and a memory storing instructions that, when executed by the processor, configure the apparatus to perform the method of any of Example 1 to Example 21.

Example 24 is an apparatus for use in a relay user equipment (UE) to provide system information (SI) from a base station in a wireless network to one or more remote UEs. The apparatus includes memory to store the SI and a processor configured to: establish a sidelink communication channel with a first remote UE, the first remote UE in a radio resource control (RRC) idle state, an RRC inactive state, or an out-of-coverage (OOC) state with respect to the base station; decode, at the relay UE, a relay SI request received through the sidelink communication channel from the first remote UE, the relay SI request indicating requested system information; obtain, at the relay UE, the requested system information or a subset of the requested system information from a memory device or from the base station; and encode, at the relay UE, a relay SI response to send to the first remote UE, the relay SI response comprising the requested system information or the subset of the requested system information.

Example 25 includes the apparatus of Example 24, wherein the processor is further configured for sending the relay SI response to the first remote UE using dedicated RRC signaling through the sidelink communication channel.

Example 26 includes the apparatus of Example 24, wherein the processor is further configured for sending the relay SI response to the first remote UE using a sidelink broadcast channel.

Example 27 includes the apparatus of Example 24, wherein obtaining the requested system information comprises: determining that the relay UE has a current or updated copy of the requested system information or the subset of the requested system information stored in the memory device; and obtaining the current or updated copy of the requested system information or the subset of the requested system information from the memory device.

Example 28 includes the apparatus of Example 24, wherein obtaining the requested system information comprises: determining that the relay UE does not have a current or updated copy of the requested system information stored in the memory device; if the relay UE is in the RRC idle state or the RRC inactive state with respect to the base station, triggering a RACH-based on-demand system information procedure to obtain the requested system information or the subset of the requested system information from the base station; and if the relay UE is in an RRC connected state with the base station, using a dedicated system information block (SIB) request to obtain the requested system information or the subset of the requested system information from the base station.

Example 29 includes the apparatus of Example 24, wherein the processor is further configured for generating a broadcast message to send to one or more second remote UEs through a sidelink broadcast channel, the broadcast message comprising minimum system information (MSI) or a subset of the MSI, the one or more second remote UEs not PC5-RRC connected to the relay UE.

Example 30 includes the apparatus of Example 29, wherein the processor is further configured for periodically broadcasting, by the relay UE, the broadcast message comprising the MSI or the subset of MSI with a same periodicity as that of a relay announcement discovery message broadcast by the relay UE.

Example 31 includes the apparatus of Example 29, wherein the processor is further configured for including the MSI or the subset of MSI in a sideline relay announcement discovery message broadcast by the relay UE.

Example 32 includes the apparatus of Example 29, wherein the processor is further configured for only broadcasting the broadcast message comprising the MSI or the subset of MSI in response to a request from the one or more second remote UEs without a sidelink RRC connection and without security protection.

Example 33 includes the apparatus of Example 29, wherein the relay UE selects one or more parameters to include in the subset of the MSI for the broadcast message, the one or more parameters selected from a group comprising public land mobile network (PLMN) identity information, emergency call (eCall) over Internet Protocol Multimedia Subsystem (IMS) support, unified access control (UAC) baring information, IMS emergency support, Positioning System Information Block (posSIB) mapping table, connection establishment failure control information, and system frame number.

Example 34 includes the apparatus of Example 29, wherein the MSI comprises a master information block (MIB) and a system information block 1 (SIB1), and wherein the relay UE includes only one or more of the following SIB1 parameters in the subset of the MSI for the broadcast message: cell access related information, Internet Protocol Multimedia Subsystem (IMS) support, emergency call (eCall) over IMS support, UE timers and constants, unified access control (UAC) baring information, use full resume identifier (useFullResumeID), UAC access category 1 selection assistance information, and cell access related information.

Example 35 includes the apparatus of Example 34, wherein the relay UE further includes all parameters from at least one of a vehicle-to-everything (V2X) system information block (SIB), an Earthquake and Tsunami Warning System (ETWS) SIB, and a Commercial Mobile Alert Service (CMAS) SIB received from the base station in the subset of the MSI for the broadcast message.

Example 36 includes the apparatus of Example 34, wherein the relay UE includes at least one of a cell barred parameter and a system frame number from the MIB in the subset of the MSI for the broadcast message.

Example 37 includes the apparatus of Example 29, wherein the broadcast message further comprises other system information (OSI) or a subset of the OSI.

Example 38 includes the apparatus of Example 24, wherein the relay UE is sidelink RRC connected with a third remote UE, wherein the third remote UE is RRC connected with the base station, and wherein the relay UE performs layer 2 (L2) relay operations for end-to-end RRC signaling between the base station and the third remote UE but does not respond to a dedicated system information block (SIB) request from the third UE to the base station with a separate sidelink dedicated signaling response and does not re-broadcast every SI broadcast detected from the base station.

Example 39 includes the apparatus of Example 24, wherein the processor is further configured for: monitoring, at the relay UE, for an SI update from the base station; and in response to detecting the SI update, forwarding the SI update or an indication of the SI update to the first remote UE.

Example 40 is a computer-readable medium on which computer-executable instructions are stored to implement a method to provide system information (SI) from a base station in a wireless network to one or more remote UEs comprising: establishing a sidelink communication channel with a first remote UE, the first remote UE in a radio resource control (RRC) idle state, an RRC inactive state, or an out-of-coverage (OOC) state with respect to the base station; decoding, at the relay UE, a relay SI request received through the sidelink communication channel from the first remote UE, the relay SI request indicating requested system information; obtaining, at the relay UE, the requested system information or a subset of the requested system information from a memory device or from the base station; and encoding, at the relay UE, a relay SI response to send to the first remote UE, the relay SI response comprising the requested system information or the subset of the requested system information.

Example 41 includes the computer-readable medium of Example 40, wherein the instructions further configure the computer to sending the relay SI response to the first remote UE using dedicated RRC signaling through the sidelink communication channel.

Example 42 includes the computer-readable medium of Example 40, wherein the instructions further configure the computer to sending the relay SI response to the first remote UE using a sidelink broadcast channel.

Example 43 includes the computer-readable medium of Example 40, wherein obtaining the requested system information comprises: determining that the relay UE has a current or updated copy of the requested system information or the subset of the requested system information stored in the memory device; and obtaining the current or updated copy of the requested system information or the subset of the requested system information from the memory device.

Example 44 includes the computer-readable medium of Example 40, wherein obtaining the requested system information comprises: determining that the relay UE does not have a current or updated copy of the requested system information stored in the memory device; if the relay UE is in the RRC idle state or the RRC inactive state with respect to the base station, triggering a RACH-based on-demand system information procedure to obtain the requested system information or the subset of the requested system information from the base station; and if the relay UE is in an RRC connected state with the base station, using a dedicated system information block (SIB) request to obtain the requested system information or the subset of the requested system information from the base station.

Example 45 includes the computer-readable medium of Example 40, wherein the instructions further configure the computer to generating a broadcast message to send to one or more second remote UEs through a sidelink broadcast channel, the broadcast message comprising minimum system information (MSI) or a subset of the MSI, the one or more second remote UEs not PC5-RRC connected to the relay UE.

Example 46 includes the computer-readable medium of Example 45, wherein the instructions further configure the computer to periodically broadcasting, by the relay UE, the broadcast message comprising the MSI or the subset of MSI with a same periodicity as that of a relay announcement discovery message broadcast by the relay UE.

Example 47 includes the computer-readable medium of Example 45, wherein the instructions further configure the computer to including the MSI or the subset of MSI in a sideline relay announcement discovery message broadcast by the relay UE.

Example 48 includes the computer-readable medium of Example 45, wherein the instructions further configure the computer to only broadcasting the broadcast message comprising the MSI or the subset of MSI in response to a request from the one or more second remote UEs without a sidelink RRC connection and without security protection.

Example 49 includes the computer-readable medium of Example 45, wherein the relay UE selects one or more parameters to include in the subset of the MSI for the broadcast message, the one or more parameters selected from a group comprising public land mobile network (PLMN) identity information, emergency call (eCall) over Internet Protocol Multimedia Subsystem (IMS) support, unified access control (UAC) baring information, IMS emergency support, Positioning System Information Block (posSIB) mapping table, connection establishment failure control information, and system frame number.

Example 50 includes the computer-readable medium of Example 45, wherein the MSI comprises a master information block (MIB) and a system information block 1 (SIB1), and wherein the relay UE includes only one or more of the following SIB1 parameters in the subset of the MSI for the broadcast message: cell access related information, Internet Protocol Multimedia Subsystem (IMS) support, emergency call (eCall) over IMS support, UE timers and constants, unified access control (UAC) baring information, use full resume identifier (useFullResumeID), UAC access category 1 selection assistance information, and cell access related information.

Example 51 includes the computer-readable medium of Example 50, wherein the relay UE further includes all parameters from at least one of a vehicle-to-everything (V2X) system information block (SIB), an Earthquake and Tsunami Warning System (ETWS) SIB, and a Commercial Mobile Alert Service (CMAS) SIB received from the base station in the subset of the MSI for the broadcast message.

Example 52 includes the computer-readable medium of Example 50, wherein the relay UE includes at least one of a cell barred parameter and a system frame number from the MIB in the subset of the MSI for the broadcast message.

Example 53 includes the computer-readable medium of Example 45, wherein the broadcast message further comprises other system information (OSI) or a subset of the OSI.

Example 54 includes the computer-readable medium of Example 40, wherein the relay UE is sidelink RRC connected with a third remote UE, wherein the third remote UE is RRC connected with the base station, and wherein the relay UE performs layer 2 (L2) relay operations for end-to-end RRC signaling between the base station and the third remote UE but does not respond to a dedicated system information block (SIB) request from the third UE to the base station with a separate sidelink dedicated signaling response and does not re-broadcast every SI broadcast detected from the base station.

Example 55 includes the computer-readable medium of Example 40, wherein the instructions further configure the computer to: monitoring, at the relay UE, for an SI update from the base station; and in response to detecting the SI update, forwarding the SI update or an indication of the SI update to the first remote UE.

Example 56 is an apparatus for use in a remote user equipment (UE). The apparatus includes a memory to store system information and a processor configured to: establish a sidelink communication channel with a relay UE, the remote UE in a radio resource control (RRC) idle state, an RRC inactive state, or an out-of-coverage (OOC) state with respect to the base station; encode, at the remote UE, a relay system information (SI) request to send to the relay UE through the sidelink communication channel, the relay SI request indicating requested system information; and process a response to the relay SI request from the relay UE, the response comprising the requested system information.

Example 57 includes the apparatus of Example 56, wherein the processor is further configured for instructions further configure the apparatus to receiving the requested system information from the relay UE using dedicated RRC signaling through the sidelink communication channel.

Example 58 includes the apparatus of Example 56, wherein the processor is further configured for receiving the requested system information from the relay UE through a sidelink broadcast channel.

Example 59 includes the apparatus of Example 56, wherein the processor is further configured for: entering an RRC connected state with the base station; sending an RRC message from the remote UE to the base station via the relay UE, the RRC message comprising a dedicated system information block (SIB) request; and receiving an RRC response message comprising system information from the base station.

Example 60 includes the apparatus of Example 59, wherein the processor is further configured for: processing an indication, from the relay UE, of modified system information; and in response to the indication, requesting the modified system information or a portion of the modified system information from the relay UE.

Example 61 is a computer-readable medium on which computer-executable instructions are stored to implement a method comprising: establishing a sidelink communication channel with a relay UE, the remote UE in a radio resource control (RRC) idle state, an RRC inactive state, or an out-of-coverage (OOC) state with respect to the base station; encoding, at the remote UE, a relay system information (SI) request to send to the relay UE through the sidelink communication channel, the relay SI request indicating requested system information; and processing a response to the relay SI request from the relay UE, the response comprising the requested system information.

Example 62 includes the computer-readable medium of Example 61, wherein the instructions further configure the computer to receiving the requested system information from the relay UE using dedicated RRC signaling through the sidelink communication channel.

Example 63 includes the computer-readable medium of Example 61, wherein the instructions further configure the computer to receiving the requested system information from the relay UE through a sidelink broadcast channel.

Example 64 includes the computer-readable medium of Example 61, wherein the instructions further configure the computer to: entering an RRC connected state with the base station; sending an RRC message from the remote UE to the base station via the relay UE, the RRC message comprising a dedicated system information block (SIB) request; and receiving an RRC response message comprising system information from the base station.

Example 65 includes the computer-readable medium of Example 64, wherein the instructions further configure the computer to: processing an indication, from the relay UE, of modified system information; and in response to the indication, requesting the modified system information or a portion of the modified system information from the relay UE.

Example 66 may include an apparatus comprising means to perform one or more elements of a method described in or related to any of the above Examples, or any other method or process described herein.

Example 67 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 68 may include an apparatus comprising logic, modules, or circuitry to perform one or more elements of a method described in or related to any of the above Examples, or any other method or process described herein.

Example 69 may include a method, technique, or process as described in or related to any of the above Examples, or portions or parts thereof.

Example 70 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 71 may include a signal as described in or related to any of the above Examples, or portions or parts thereof.

Example 72 may include a datagram, packet, frame, segment, protocol data unit (PDU), or message as described in or related to any of the above Examples, or portions or parts thereof, or otherwise described in the present disclosure.

Example 73 may include a signal encoded with data as described in or related to any of the above Examples, or portions or parts thereof, or otherwise described in the present disclosure.

Example 74 may include a signal encoded with a datagram, packet, frame, segment, PDU, or message as described in or related to any of the above Examples, or portions or parts thereof, or otherwise described in the present disclosure.

Example 75 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 76 may include a computer program comprising instructions, wherein execution of the program by a processing element is to cause the processing element to carry out the method, techniques, or process as described in or related to any of the above Examples, or portions thereof.

Example 77 may include a signal in a wireless network as shown and described herein.

Example 78 may include a method of communicating in a wireless network as shown and described herein.

Example 79 may include a system for providing wireless communication as shown and described herein.

Example 80 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that arc generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a relay user equipment (UE) to provide system information (SI) from a base station in a wireless network to one or more remote UEs, the method comprising:
   establishing a sidelink communication channel with a first remote UE, the first remote UE in a radio resource control (RRC) idle state, an RRC inactive state, or an out-of-coverage (OOC) state with respect to the base station;
   decoding, at the relay UE, a relay SI request received through the sidelink communication channel from the first remote UE, the relay SI request indicating requested system information;
   obtaining, at the relay UE, the requested system information or a subset of the requested system information from a memory device or from the base station;
   encoding, at the relay UE, a relay SI response to send to the first remote UE, the relay SI response comprising the requested system information or the subset of the requested system information;
   monitoring, at the relay UE, for an SI update from the base station;
   in response to detecting the SI update, forwarding the SI update or an indication of the SI update to the first remote UE; and
   generating a broadcast message to send broadcasted system information to one or more second remote UEs through a sidelink broadcast channel, the one or more second remote UEs not RRC connected to the relay UE through a sidelink interface.

2. The method of claim 1, further comprising sending the relay SI response to the first remote UE using dedicated RRC signaling through the sidelink communication channel.

3. The method of claim 1, further comprising sending the relay SI response to the first remote UE using a sidelink broadcast channel.

4. The method of claim 1, wherein obtaining the requested system information comprises:

determining that the relay UE has a current or updated copy of the requested system information or the subset of the requested system information stored in the memory device; and obtaining the current or updated copy of the requested system information or the subset of the requested system information from the memory device.

5. The method of claim 1, wherein obtaining the requested system information comprises:

determining that the relay UE does not have a current or updated copy of the requested system information stored in the memory device;

if the relay UE is in the RRC idle state or the RRC inactive state with respect to the base station, triggering a random access channel (RACH)-based on-demand system information procedure to obtain the requested system information or the subset of the requested system information from the base station; and if the relay UE is in an RRC connected state with the base station, using a dedicated system information block (SIB) request to obtain the requested system information or the subset of the requested system information from the base station.

6. The method of claim 1, wherein the broadcasted system information comprises at least one of minimum system information (MSI), a subset of the MSI, other system information, and on-demand system information.

7. The method of claim 6, further comprising periodically broadcasting, by the relay UE, the broadcast message comprising the MSI or the subset of MSI with a same periodicity as that of a relay announcement discovery message broadcast by the relay UE.

8. The method of claim 6, further comprising including the MSI or the subset of MSI in a sidelink relay announcement discovery message broadcast by the relay UE.

9. The method of claim 6, further comprising only broadcasting the broadcast message comprising the MSI or the subset of MSI in response to a request from the one or more second remote UEs without a sidelink RRC connection and without security protection.

10. The method of claim 6, wherein the relay UE selects one or more parameters to include in the subset of the MSI for the broadcast message, the one or more parameters selected from a group comprising public land mobile network (PLMN) identity information, emergency call (eCall) over Internet Protocol Multimedia Subsystem (IMS) support, unified access control (UAC) barring information, IMS emergency support, Positioning System Information Block (posSIB) mapping table, connection establishment failure control information, and system frame number.

11. The method of claim 6, wherein the MSI comprises a master information block (MIB) and a system information block 1 (SIB1), and wherein the relay UE includes only one or more of the following SIB1 parameters in the subset of the MSI for the broadcast message: cell access related information, Internet Protocol Multimedia Subsystem (IMS) support, emergency call (eCall) over IMS support, UE timers and constants, unified access control (UAC) barring information, use full resume identifier (useFullResumeID), UAC access category 1 selection assistance information, and cell access related information.

12. The method of claim 11, wherein the relay UE further includes all parameters from at least one of a vehicle-to-everything (V2X) system information block (SIB), an Earthquake and Tsunami Warning System (ETWS) SIB, and a Commercial Mobile Alert Service (CMAS) SIB received from the base station in the subset of the MSI for the broadcast message.

13. The method of claim 11, wherein the relay UE includes at least one of a cell barred parameter and a system frame number from the MIB in the subset of the MSI for the broadcast message.

14. The method of claim 1, wherein the relay UE is sidelink RRC connected with a third remote UE, wherein the third remote UE is RRC connected with the base station, and wherein the relay UE performs layer 2 (L2) relay operations for end-to-end RRC signaling between the base station and the third remote UE but does not respond to a dedicated system information block (SIB) request from the third UE to the base station with a separate sidelink dedicated signaling response and does not re-broadcast every SI broadcast detected from the base station.

* * * * *